United States Patent [19]

Murai

[11] Patent Number: 5,174,039
[45] Date of Patent: Dec. 29, 1992

[54] DISPLACEMENT-MEASURING APPARATUS, AND STATIC-PRESSURE BEARING DEVICE FOR USE IN THE DISPLACEMENT-MEASURING APPARATUS

[75] Inventor: Seiichiro Murai, Yokohama, Japan

[73] Assignee: Kabushiki Kaisha Toshiba, Kawasaki, Japan

[21] Appl. No.: 745,460

[22] Filed: Aug. 14, 1991

[30] Foreign Application Priority Data

Aug. 17, 1990 [JP] Japan .................. 2-215915
Aug. 17, 1990 [JP] Japan .................. 2-215916

[51] Int. Cl.$^5$ .................. G01B 5/00; F16C 32/06
[52] U.S. Cl. .................. 33/556; 33/558; 33/561; 33/DIG. 2; 33/DIG. 13; 33/504; 384/12; 73/37.5
[58] Field of Search .............. 33/556–561, 33/DIG. 2, DIG. 13, 503, 504; 384/12, 100; 73/37.5; 356/358

[56] References Cited

U.S. PATENT DOCUMENTS

| 3,432,313 | 3/1969 | Adams | 384/100 |
|---|---|---|---|
| 3,522,761 | 8/1970 | Arneson | 384/12 |
| 4,347,441 | 8/1982 | Dil et al. | 356/358 |
| 4,509,263 | 4/1985 | Andrié et al. | 33/558 |
| 4,601,111 | 7/1986 | Berchtold | 33/556 |
| 5,018,278 | 5/1991 | Aehnelt et al. | 33/556 |
| 5,040,306 | 8/1991 | McMurtry et al. | 33/558 |

FOREIGN PATENT DOCUMENTS

| 0100716 | 2/1984 | European Pat. Off. . | |
|---|---|---|---|
| 0379682 | 8/1990 | European Pat. Off. . | |
| 0001824 | 1/1982 | Japan | 384/12 |
| 0140110 | 7/1985 | Japan | 33/503 |
| 61-172011 | 12/1986 | Japan . | |
| 2121892 | 1/1984 | United Kingdom | 384/100 |
| 2136573 | 9/1984 | United Kingdom . | |

*Primary Examiner*—William A. Cuchlinski, Jr.
*Assistant Examiner*—Alvin Wirthlin
*Attorney, Agent, or Firm*—Cushman, Darby & Cushman

[57] ABSTRACT

A displacement-measuring apparatus including a cylindrical housing, a static-pressure bearing located within the housing, a probe shaft supported by the bearing so that the bearing is supported in non-contact fashion and is movable in the axial direction, and a stylus connected to the end of the probe shaft so as to apply pressure to an object. Part of the static-pressure bearing includes a hollow cylindrical bush and at least two restriction holes formed in the bush and equidistantly spaced along the circumference of the bush. These holes supply air into the gap between the probe shaft and the bush. The static-pressure bearing further includes a first set of grooves formed in the inner surface of the bush that extend along the axis of the bush so that each opposes at least one restriction hole, and a second set of grooves formed in the circumferential surface of the probe shaft that extend along the axis of the probe shaft. The second set of grooves are arranged in pairs with each pair being made of two grooves that are symmetrical with respect to the corresponding groove of the first set.

13 Claims, 11 Drawing Sheets

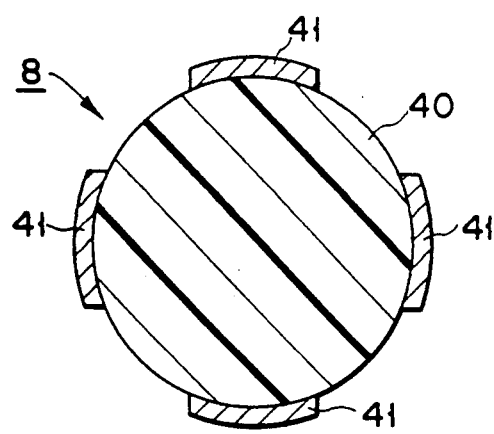
F I G. 2
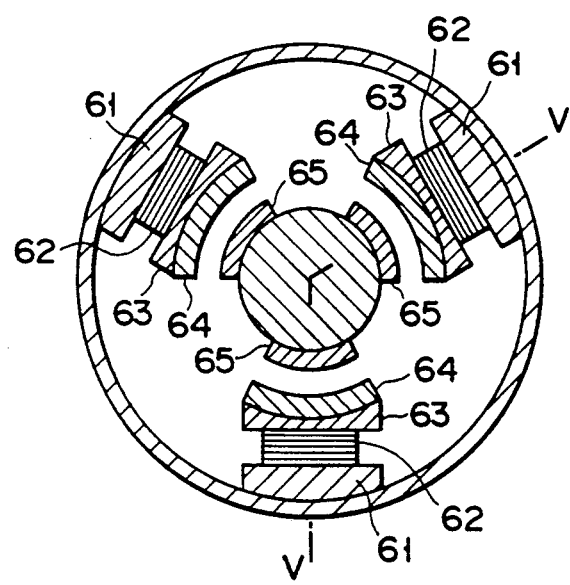
F I G. 4
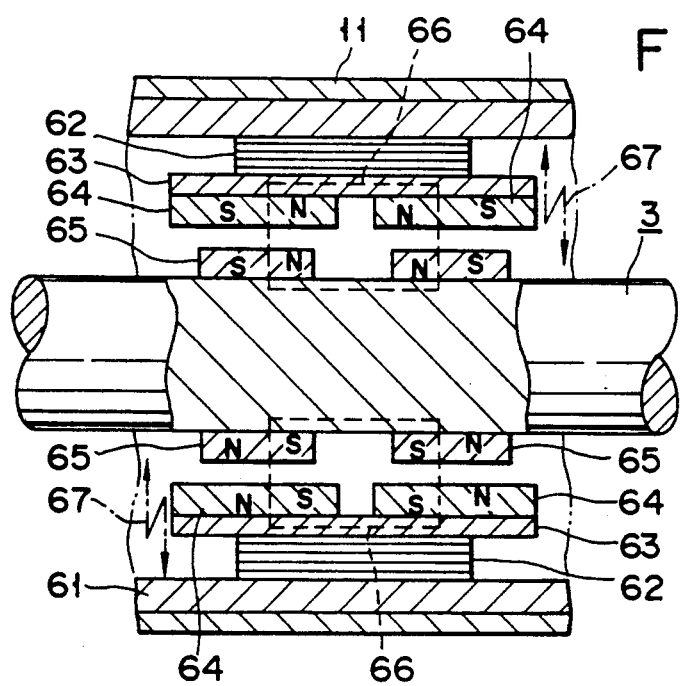
F I G. 5

DISPLACEMENT-MEASURING APPARATUS, AND STATIC-PRESSURE BEARING DEVICE FOR USE IN THE DISPLACEMENT-MEASURING APPARATUS

BACKGROUND OF THE INVENTION

1. Field of the Invention

The present invention relates to a displacement-measuring apparatus which has a stylus movable relative to an object for detecting the shape of the object, and also to a static-pressure bearing device designed for use in the displacement-measuring apparatus.

2. Description of the Related Art

A displacement-measuring apparatus for detecting the shapes of objects has an air bearing, a probe shaft, and a stylus. The air bearing supports the probe shaft, not contacting the shaft, such that the shaft can move in its axial direction. The stylus is attached to the distal end of the probe shaft, and put in rolling contact with an object, applying a predetermined contact pressure thereto. As the object is rotated, the stylus set in rolling contact moves back and forth in its axial direction. The stroke of the stylus is transmitted to and detected by the probe shaft.

FIG. 15 shows a conventional displacement-measuring apparatus A, which comprises a cylindrical housing X, an air bearing B located within the housing X, and a probe shaft C supported by the bearing B. The air bearing B has a through hole extending in its axial direction, the through hole having a rectangular cross section. The probe shaft C has a rectangular cross section and is loosely fitted in the through hole of the bearing B, such that it can move along its axis but cannot rotate around its axis.

The apparatus A further comprises a stylus D, a corner cube E, a core F, and a bias coil G. The stylus D is connected to the distal end of the probe shaft C. The core F is a hollow cylinder mounted on the proximal end portion of the shaft C. The corner cube E is fastened to the core F and, hence, to the proximal end of the probe shaft C, for detecting the displacement of the probe shaft C. The bias coil G is contained in the housing X and surrounds the core F, not contacting the core F.

FIG. 16 shows another conventional displacement-measuring apparatus H, which comprises a cylindrical housing I, an air bearing J located within the housing I, and a probe shaft K supported by the air bearing J under static pressure. The apparatus H further comprises a stylus L and a pin N. The stylus L is attached to the distal end of the probe shaft K. The pin N is set in screw engagement in a screw hole made in the wall of the housing I and protrudes into a U-groove M which is cut in the outer periphery of the proximal end portion of the shaft K and which extends parallel to the axis of the shaft K.

The air bearing J and the probe shaft K are spaced apart. Compressed air is supplied into the gap between the air bearing J and the shaft K from an air inlet port R through an air passage Q. The compressed air flows out of the gap and is discharged outside through an air outlet port S. The opening of the passage Q is adjusted by turning an adjustment screw (not shown).

In the displacement-measuring apparatus A, the contact pressure the stylus D applies to the object is controlled by changing the current supplied to the bias coil G. The larger the current, the more heat the coil G generates. There is the possibility that the heat impairs the reliability of the data acquired by operating the apparatus A for a long period of time. To reduce this possibility, a heat-radiating mechanism can be added to the displacement-measuring apparatus A. The use of such a mechanism renders the apparatus A complex and large.

The displacement-measuring apparatus A, shown in FIG. 15, has no sensors for the contact pressure applied from the stylus D to the object. Therefore, in the apparatus A it is impossible to adjust the current supplied to the bias coil G, minutely in accordance with slight changes in the contact pressure. This is detrimental to accurate detection of the shape of the object.

Further, as has been described, the probe shaft C has a rectangular cross section and is loosely fitted in the through hole of the bearing B which has a can move along its axis, but cannot rotate around its axis. Obviously, more labor and time are required to fit a bearing bush into the gap between the through hole and the shaft C and adjust this gap, than to place a bush into the gap between a circular hole and a shaft having a circular cross section and adjust the gap.

In the displacement-measuring apparatus H, shown in FIG. 16, the screw is turned to adjust the opening of the air passage Q. The rate at which the air flows outside through the air outlet port S is thereby controlled, thus adjusting the contact pressure the stylus L applies to the object. However, no measures are taken against changes in the characteristic of the air bearing J or changes in the contact pressure.

The pin N set in screw engagement in a hole made in the wall of the housing I is loosely fitted in the U-groove M cut in the outer periphery of the shaft K and extending along the axis of the shaft K. Hence, the pin N prevents the probe shaft K from rotating around its axis. The pin N hinders smooth moving of the shaft K. Due to the friction between the pin N and the shaft K, the shaft K may fail to move faithfully to the motion of the stylus L.

SUMMARY OF THE INVENTION

Accordingly, the object of the present invention is to provide a displacement-measuring apparatus in which little heat, if any, is generated, and the contact pressure applied to an object scarcely changes.

According to the invention, there is provided a displacement-measuring apparatus comprising: a cylindrical housing; a static-pressure bearing located in the housing; a probe shaft supported by the bearing in non-contact fashion and movable in an axial direction; a stylus connected to one end of the probe shaft, for applying a contact pressure to an object; a pressure-adjusting section for adjusting the contact pressure applied from the stylus to the object; a pressure-detecting section for detecting the contact pressure applied from the stylus to the object; and a pressure-controlling section for generating a control signal in accordance with the contract pressure detected by the pressure-detecting section and supplying the control signal to the pressure-adjusting section, thereby to control the contact pressure.

In operation, the pressure-detecting section detects the contact pressure the stylus applies to the object. In accordance with the contact pressure thus detected, the pressure-adjusting section controls the contact pressure in real time. Hence, the contact pressure is minutely controlled. susceptible to slight changes in the contact pressure. Since the pressure-adjusting section generates virtually no heat, the apparatus can measure the displacement of the object with high accuracy.

BRIEF DESCRIPTION OF THE DRAWINGS

FIG. 2 is a cross-sectional view showing the contact pressure detecting section of the apparatus shown in FIG. 1;

FIG. 4 is a cross-sectional view of a pressure adjusting section;

FIG. 5 is a sectional view, taken along line V—V in FIG. 4;

DETAILED DESCRIPTION OF THE PREFERRED EMBODIMENTS

Embodiments of the present invention will now be described, with reference to the accompanying drawings.

Figure 1:
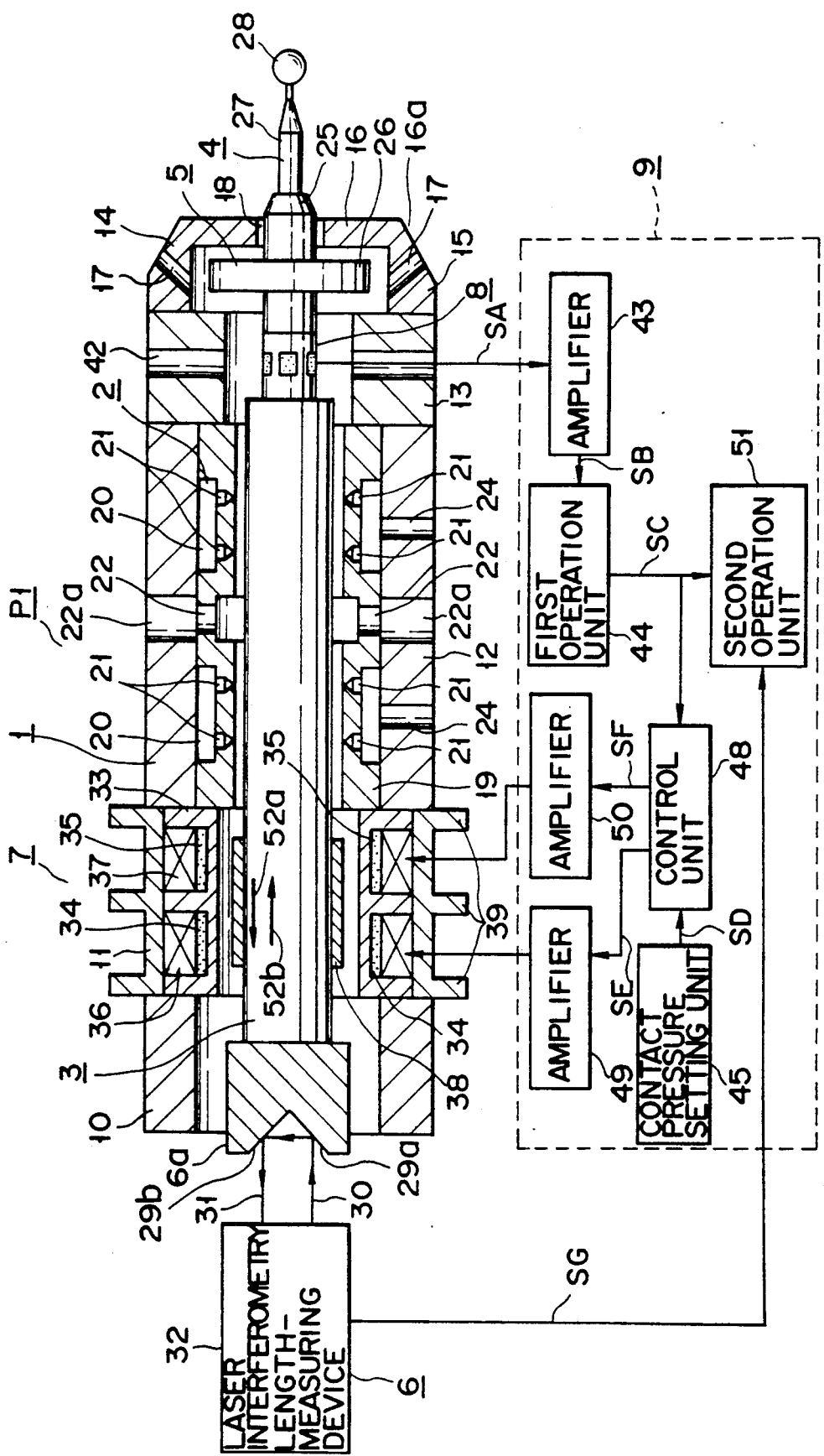
FIG. 1 shows a displacement-measuring apparatus according to a first embodiment of the invention.

FIG. 1 shows a displacement-measuring apparatus P1 according to a first embodiment of the invention. The apparatus P1 comprises a cylindrical housing 1, an air bearing 2 (i.e., a static-pressure bearing) located in the housing 1, and a probe shaft 3 supported in non-contact fashion by the bearing 2, having a circular cross section and able to move in its axial direction.

The displacement-measuring apparatus P1 further comprises a stylus 4, a stopper 5, and a length-measuring section 6. The stylus 4 is connected to the distal end of the probe shaft 3 and positioned coaxially with the shaft 3. The stylus is set in direct contact with an object in order to measure the displacement of the object. The stopper 5 is arranged between the shaft 3 and the stylus 4, for restricting the axial movement of the probe shaft 3. The length-measuring section 6 is attached to the proximal end of the probe shaft 3. The section 6 has a corner cube 6a which is designed to detect the displacement of the probe shaft 3.

The apparatus P1 has a contact-pressure adjusting section 7, a contact-pressure detecting section 8, and a contact-pressure controlling section 9. The section 7 is located in the proximal end portion of the housing 1 and mounted on the probe shaft 3. The section 8 is located between the shaft 3 and the stopper 5, for detecting the contact pressure applied from the stylus 4 to the object and generating an electric signal representing the pressure detected. The section 9 is an electric device for generating a control signal from the signal generated by the contact pressure detecting section 8 and supplying the control signal to the contact pressure adjusting section 7.

The housing 1 comprises five parts numbered 10 to 14. The first part 10 surrounds the corner cube 6a and positioned coaxially therewith. The second part 11 is coupled to the first part 10 and holds the contact pressure adjusting section 7. The third part 12 is connected to the second part 11 and holds the air bearing 2. The fourth part 13 is connected to the third part 12, surrounds the contact pressure detecting section 8, and located coaxial therewith. The fifth part 14 is coupled to the fourth part 13, loosely holds the stopper 5, and is positioned coaxially therewith.

The fifth part 14 of the housing 1 comprises a cylindrical section 15 and an end plate 16 closing the distal end of the cylindrical section 15. The cylindrical section 15 has a tapered circumferential surface 16a. A through hole 18 is formed in the cylindrical section 15 and opens at one end in the surface 16a and at the other end at the inner surface. A through hole 17 is formed in the end plate 16, coaxial with the stopper 5.

The air bearing 2 is formed of a hollow cylindrical metal bush 19. Two annular guide grooves 20 are cut in the outer circumferential surface of the bush 19. Restriction holes 21 are made in the bottom of either guide groove 20, narrowing toward, and opening at, the inner circumferential surface of the bush 19. Outlet holes 22 are made in that thick-wall portion of the bush 19 which is located between the annular guide grooves 20. The holes 22 are equidistantly spaced part around the circumference of the bush 19. Compressed air is jetted from the grooves 20 via the restriction holes 21 into the interior of the air bearing 2. The air is discharged from the bush 19 through the outlet holes 22.

Another set of outlet holes 22a are made in the third part 12 of the housing 1 and positioned coaxial with the outlet holes 22 of the metal bush 19. The third part 12 has two inlet holes 24 which communicate with the annular guide grooves 20 of the bush 19. It is through these inlet holes 24 that compressed air is supplied to the guide groove 20 and ultimately into the interior of the air bearing 2. Both inlet holes 24 are connected to a source of compressed air (not shown).

The stopper 5 is comprised of a shaft 25 and a flange 26. The shaft 25 is coupled to the probe shaft 3 and is coaxial therewith. Its distal end portion protrudes from the distal end of the housing 1, extending through the hole 17 of the end plate 16. The flange 26 is mounted on the middle portion of the shaft 25. The flange 26 can move in the axial direction of the probe shaft 3 in the space between the fourth part 13 of the housing 1 and the end plate 16. Hence, the stopper 5 can move back and forth, for the distance between the housing part 13 and the end plate 16.

The stylus 4 comprises a main shaft 27 and a ruby ball 28. The main shaft has a pointed distal end. The ruby ball 28 is connected to the pointed end of the main shaft 27.

The length-measuring section 6 comprises the corner cube 6a and a laser interferometry length-measuring device 32. The corner cube 6a has a two reflection surfaces 29a and 29b at its proximal end. These surfaces 29a and 29 incline at 45° to the axis of the probe shaft 3 and intersect at 90° with each other. The laser interferometry length-measuring device 32 applies a laser beam 30 to the first reflection surface 29a along the axis of the probe shaft 3, and detects the displacement of the probe shaft 3 from the interference characteristic of the laser beam 31 reflected by both reflection surfaces 29a and 29b and applied to the device 32 along the axis of the shaft 3.

The contact pressure adjusting section 7 comprises a hollow cylindrical bobbin 33, a pair of permanent magnets 34 and 35, a pair of coils 36 and 37, and a hollow cylindrical core 38. The core 38 is mounted on the probe shaft 3. The bobbin 33 surrounds the core 38 and has two annular U-grooves cut in its outer circumferential surface. The magnets 34 and 35 are ring-shaped and fitted in the U-grooves. The coils 36 and 37 are wound around the magnets 34 and 35.

Electric power is supplied to the coils 36 and 37 from a power supply (not shown). The power is changed, thereby changing the magnetic force generated between the magnet 34 and the coil 36, and also changing the magnetic force generated between the magnet 35 and the coil 37. When supplied with electric power, either coil generates heat. Nonetheless, the heat is radiated effectively from the second part 11 of the housing 1 since heat-radiating annular fins 39 are mounted on the second housing part 11.

When electric power is supplied to neither the coil 36 nor the coil 37, the magnetic force generated between the core 38 and the magnets 34 and 35, thrusts the probe shaft 3 to the right, whereby the stylus 4 applies a permanent contact pressure PO to an object. When electric power is supplied to the coils 36 and 37, a magnetic force is generated between the core 38 and the coils 36 and 37. This force is added to the magnetic force generated between the core 38 and the magnets 34 and 35, whereby the contact pressure increases from the permanent value PO to a desired value PA.

As is best shown in FIG. 2, the contact pressure detecting section 8 comprises an elastic solid cylinder 40 and strain detecting means 41 (such as strain gauges). The elastic cylinder 40 is clamped between the probe shaft 3 and the shaft 25 of the stopper 5 and positioned coaxial therewith. The strain gauges 41 are bonded on the circumferential surface of the cylinder 40 and equidistantly spaced part along the circumference of the cylinder 40. The strain gauges 41 generates displacement signals SA of the voltages which represent the strain applied to the elastic cylinder 40. The fourth housing part 13, which surrounds the elastic cylinder 40, has through holes 42 which extend in radial direction of the part 13. Wires extend through these holes 42 and are connected at one end to the strain gauges 41.

The contact pressure controlling section 9 comprises an amplifier 43, a first operation unit 44, a contact pressure setting unit 45, a control unit 48, amplifiers 49 and 50, and a second operation unit 51. The amplifier 43 is electrically connected by the wires to the strain gauges 41, for amplifying the displacement signals SA generated by the strain gauges 41. The first operation unit 44 is connected to the output of the amplifier 43. The unit 44 receives the amplified displacement signals SB from the amplifier 43 and calculates, from the signals SB, the strain along the axis of the elastic cylinder 40 which is proportional to the contact pressure P in terms of contact pressure P. The unit 44 also calculates the inclination of the cylinder 40 with respect to the axis of the probe shaft 3.

The contact pressure setting unit 45 is operated to set a desired contact pressure, i.e., a target contact pressure PA. The control unit 48 receives an electric signal SC output by the unit 44, and also an electric signal SD output by the unit 45. The signal SC represents both the pressure P calculated by the unit 44 and the inclination ΔT. The unit 48 outputs two control signals SE and SF for eliminating the difference ΔP between the target contact pressure PA set by the unit 35 and the contact pressure P detected by the section 8.

The amplifiers 49 and 50 amplify the control signals SE and SF output by the control unit 48, respectively. The signals SE and SF, thus amplified, are supplied to the coils 36 and 37. The second operation unit 51 receives the signal SC and a displacement signal SG. The signal SC output by the first operation unit 44 represents the contact pressure P and the inclination ΔT, as has been described. The displacement signal SG has been output by the laser interferometry length-measuring device 32 and represents the displacement of the probe shaft 3. The second operation unit 51 calculates the actual displacement of the probe shaft 3 from the strain $\epsilon$ and the inclination ΔT.

The operation of the displacement-measuring apparatus P1 described above will now be explained.

First, compressed air is supplied into the annular guide grooves 20 through the inlet holes 24. The air is further supplied into the gap between the probe shaft 3 and the housing 1 via the restriction holes 21 made in the bottoms of the guide grooves 20. As a result, the air bearing 2 supports the probe shaft 3 in non-contact fashion, positioning the shaft 3 coaxial with the housing 1. The compressed air jetting through the restriction holes 21 is discharged from the apparatus P1 through the outlet holes 22 of the metal bush 19, the outlet holes 22a of the third housing part 12, and finally through the hole 17 of the fifth housing part 14 and the through holes 42 of the fourth housing part 13.

Next, the apparatus P1 is positioned, bringing the stylus 4 into contact with an object. At this time, the contact pressure controlling section 9 and the length-measuring device 32 are already operative. The device 32 applies a laser beam 30 to the first reflection surface 29a of the corner cube 6a, receives the laser beam 31 reflected from the second reflection surface 29b of the corner cube 6a, and measures the displacement of the probe shaft 3. Meanwhile, a predetermined power is supplied to the coils 36 and 37 of the contact pressure adjusting section 7.

When the stylus 4 contacts the object, the probe shaft 3 tends to move backwards, in the direction of arrow 52a as is shown in FIG. 1. However, it is pushed forward in the direction of arrow 52b, due to the magnetic force generated between the core 38 and the permanent magnets 34 and 35, and also due to the magnetic force generated between the core 38 and the coils 36 and 27. As a result, the stylus 4 applies a contact pressure to the object, giving a strain to the elastic cylinder 40 and, hence, deforming the cylinder 40.

Then, the strain gauges 41 bonded to the circumferential surface of the elastic cylinder 40 generate displacement signals SA, each representing the voltage equivalent to the strain the gauge 41 detects. These signals SA are supplied to the contact pressure controlling section 9. In the section 9, the amplifier 43 amplifies the signals SA and outputs signals SB, which are supplied to the first operation unit 44. The unit 44 calculates the strain along the axis of the elastic cylinder 40 which is proportional to the contact pressure P, and also determines the inclination $\Delta T$ of the cylinder 40 with respect to the axis of the probe shaft 3, and generates an electric signal SC which represents both the contact pressure P and the inclination $\Delta T$.

In the meantime, the contact pressure setting unit 45 sets a target contact pressure PA which the stylus 4 should apply to the object, and outputs a target-pressure signal SD. The control unit 48 receives the target-pressure signal SD and also the electric signal SC output by the first operation unit 44. The unit 48 outputs two control signals SE and SF for eliminating the difference $\Delta P$ between the target contact pressure PA set by the unit 35 and the contact pressure P. The control signals SE and SF are input to the amplifiers 49 and 50, which amplify the signals SE and SF output by the control unit 48, respectively. The outputs of the amplifiers 49 and 50, i.e., amplified signals SE' and SF' are supplied to the coils 36 and 37.

In accordance with the magnitudes of the signals SE' and SF', the coils 36 and 37 generate magnetic fields which create a magnetic force. This magnetic force is added to the magnetic force generated between the core 38 and the permanent magnets 34 and 35. As a result, the contact pressure applied from the stylus 4 to the object increases from the permanent value PO to the target value PA.

The feedback control described above is performed in real time, throughout the displacement-measuring operation.

Meanwhile, the second operation unit 51 receives the signal SC output by the first operation unit 44 and the displacement signal SG supplied by the length-measuring device 32. As has been described, the signal SC represents the contact pressure P and the inclination $\Delta T$ of the elastic cylinder 40, whereas the signal SG represents the displacement of the probe shaft 3. From these input signals SC and SG, which represent the strain $\epsilon$ along the axis of the cylinder 40 and the inclination $\Delta T$ thereof, the second operation unit 51 calculates the actual displacement of the probe shaft 3, and generates data representing the actual displacement of the shaft 3. This data is supplied to a display (not shown), whereby the actual displacement of the probe shaft 3 is monitored.

As has been explained, in the displacement-measuring apparatus P1 (FIG. 1), the contact pressure detecting section 8 detects the contact pressure applied from the stylus 4 to the object, and the contact pressure adjusting section 7 is controlled in accordance with the contact pressure thus detected, thereby changing the pressure to a target value. Hence, the contact pressure applied from the stylus to the object is adjusted in real time.

As has been described, the contact pressure applied to the object results not only from the magnetic force generated between the core 38 and the coils 36 and 37, but also from the magnetic force generated between the core 38 and the permanent magnets 34 and 35. The electric power supplied to the coils 36 and 37 is less than what it should be if the permanent magnets 34 and 35 were not used. The heat these coils 36 and 37 generate is therefore proportionally less than in the case where neither magnet is provided. Obviously, this helps to measure the displacement of the probe shaft 3 with high precision. The apparatus P1 can therefore have high displacement-measuring accuracy.

Figure 3:
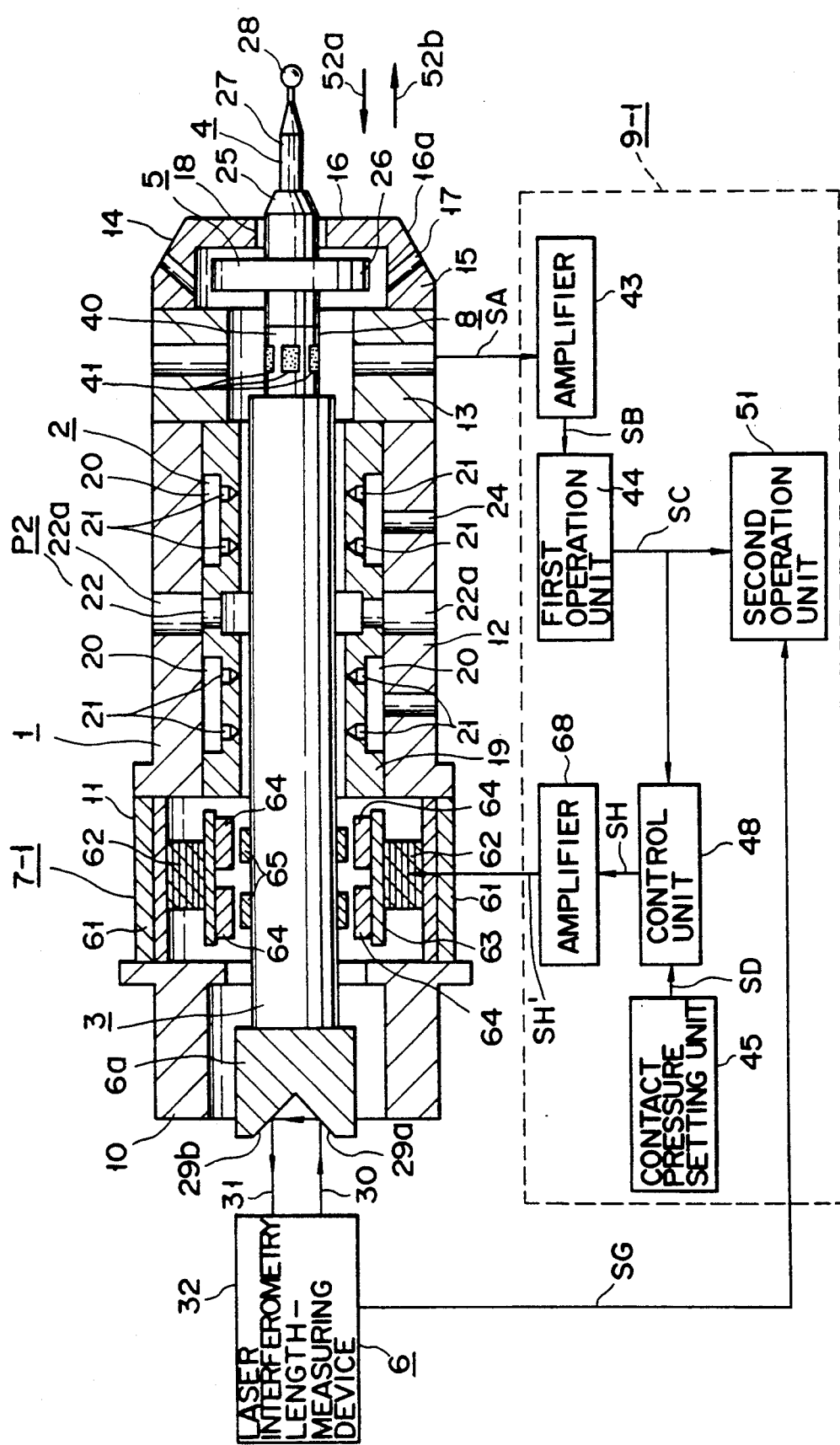
FIG. 3 shows a displacement-measuring apparatus according to a second embodiment of the invention.

FIG. 3 shows a displacement-measuring apparatus P2 according to a second embodiment of the invention. Some of the components of this apparatus P2 are identical to the corresponding components of the apparatus P1 (i.e., the first embodiment of the invention). Therefore, they are designated by the same numerals in FIG. 3, and will not be described in detail.

As is shown in FIGS. 4 and 5, the contact pressure adjusting section 7-1 of the apparatus P2 comprises three spacers 61 made of non-magnetic material, three piezoelectric actuators 62 each being a laminate of plates, three plate-like yokes 63 made of ferromagnetic material, three pairs of permanent magnets 64, and three pairs of permanent magnets 65.

The spacers 61 are secured to the inner circumferential surface of a second part 11 of a housing 1, and are spaced equidistantly apart along the circumference of the housing 1. The piezoelectric actuators 62 are connected to the spacers 61, respectively. The yokes 63 are fixed to the piezoelectric actuators 62, respectively, and each has a curving surface defining a circle concentric to the housing 1. The permanent magnets 64 of each pair, both bent gently along a circle concentric to the housing 1, are connected to the corresponding yoke 63. As is evident from FIG. 5, the magnets 64 and 65 are spaced apart from each other along a line parallel to the axis of the housing 1, with the N pole of the first magnet 64 opposing the S pole of the second magnet 65. The three pairs of permanent magnets 65 are mounted on the circumferential surface of the probe shaft 3 located within the housing 1 and coaxial therewith. These magnet pairs are spaced equidistantly apart along the circumference of the probe shaft 3. The magnets 65 of each pair are set apart from each other in a line parallel to the axis of the shaft 3, with the N pole of the first magnet 65 opposing the S pole of the second magnet 65.

The apparatus P2 comprises a contact pressure controlling section 9-1. The section 9-1 is identical to the contact pressure controlling section 9 of the apparatus P1 (FIG. 1), except that one amplifier 68 is used in place of the amplifiers 49 and 50. In the section 9-1, the amplifier 68 is connected to the control unit 48.

The piezoelectric actuators 62 of the contact pressure adjusting section 7-1 are connected to the amplifier 68. When a voltage is applied to the actuators 62 from the amplifier 68, the actuators 62 expand or contract in the radial direction of the housing 1. Each piezoelectric actuator 62 has been prepared by the following method.

First, a sintered ceramic mass is cut into plates. Then, the ceramic plates are processed. Next, the processed ceramic plates are laid one upon another. An electrode is coated on the uppermost plate, and another electrode is coated on the lowermost plate. Finally, the ceramic plates are adhered together or pressed bonded, forming a laminate of ceramic plates. Preferably, the ceramic is $Pb(Zr, Ti)O_3$ (PZT), $PbTiO_3$ (PT), or $(Pb, La)(Zr, Ti)O_3$ (PLZT).

The permanent magnets 64 of each pair are secured to the corresponding yoke 63, such that the N pole of the first magnet 64 opposes the S pole of the second magnet 64 as is evident from FIG. 5. Similarly, the permanent magnets 65 of each pair are arranged on the probe shaft 3, such that the N pole of the first magnet 65 opposes the S pole of the second magnet 65 as is shown in FIG. 5. Therefore, the magnetic fluxes from these magnets 64 and 65 form a magnetic circuit 66 indicated by broken lines in FIG. 5. The gap between any pair of the magnets 64 and the corresponding pair of magnets 65 is adjusted as the piezoelectric actuator 62 expands or contracts in the direction of arrow 67.

The operation of the displacement-measuring apparatus P2 shown in FIGS. 3, 4 and 5 will now be explained.

First, compressed air is supplied from a source of compressed air (not shown) into the annular guide grooves 20 through the inlet holes 24. The air is further supplied into the gap between the probe shaft 3 and the housing 1 via the restriction holes 21 made in the bottoms of the guide grooves 20. As a result, the air bearing 2 supports the probe shaft 3 in non-contact fashion, positioning the shaft 3 coaxial with the housing 1. The compressed air jetting through the restriction holes 21 is discharged from the apparatus P2 via the outlet holes 22 of the metal bush 19, the outlet holes 22a of the third housing part 12, and finally through the hole 17 of the fifth housing part 14 and the through holes 42 of the fourth housing part 13.

Next, the apparatus P2 is positioned, bringing the stylus 4 into contact with an object. At this time, the contact pressure controlling section 9-1 and the length-measuring device 32 are already operative. The device 32 applies a laser beam 30 to the first reflection surface 29a of the corner cube 6a, receives the laser beam 31 reflected from the second reflection surface 29b of the corner cube 6a, and measures the displacement of the probe shaft 3. Meanwhile, a predetermined power is supplied to the coils 36 and 37 of the contact pressure adjusting section 7-1.

When the stylus 4 contacts the object, the probe shaft 3 tends to move backwards, in the direction of arrow 52a as is shown in FIG. 3. However, it is pushed forward in the direction of arrow 52b, due to the magnetic force generated between the permanent magnets 64, on the one hand, and the permanent magnets 65, on the other. As a result, the stylus 4 applies a contact pressure to the object, giving a strain to the elastic cylinder 40 and, hence, deforming the cylinder 40.

Then, the strain gauges 41 bonded to the circumferential surface of the elastic cylinder 40 generate displacement signals SA, each representing the voltage equivalent to the strain the gauge 41 detects. These signals SA are supplied to the contact pressure controlling section 9-1. In the section 9-1, the amplifier 43 amplifies the signals SA and outputs signals SB, which are supplied to the first operation unit 44. The unit 44 calculates the strain along the axis of the elastic cylinder 40 which is proportional to the contact pressure P, and also determines the inclination ΔT of the cylinder 40 with respect to the axis of the probe shaft 3, and generates an electric signal SC which represents both the contact pressure P and the inclination ΔT.

In the meantime, the contact pressure setting unit 45 sets a target contact pressure PA which the stylus 4 should apply to the object, and outputs a target-pressure signal SD. The control unit 48 receives the target-pressure signal SD and also the electric signal SC output by the first operation unit 44. The unit 48 outputs a control signal SH for eliminating the difference ΔP between the target contact pressure PA set by the unit 35 and the contact pressure P. The control signal SH is input to the amplifier 68, which amplifies the control signal SH output by the control unit 48. The output of the amplifier 68, i.e., the amplified signal SH', is supplied to the piezoelectric actuators 62 of the contact pressure adjusting section 7-1.

In accordance with the magnitude of the control signal SH', the piezoelectric actuators 62 expand or contract in the direction of arrows 67 as is shown in FIG. 5. As a result, the gap between any pair of permanent magnets 64 and the corresponding pair of permanent magnets 65 changes, whereby the magnetic attraction between the pairs of magnets changes in inverse proportion to the gap, as can be understood from the graph of FIG. 6. That is, the expansion or contraction of each actuator 62 is controlled by the control signal SH', thereby adjusting the contact pressure the stylus 4 applies to the object.

Figure 6:
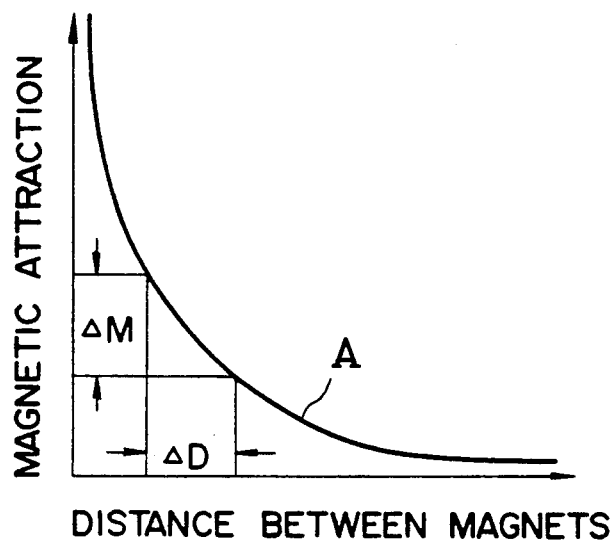
FIG. 6 is a graph representing the relation between magnetic attraction and inter-magnet distance, and explaining the operating characteristic of the apparatus shown in FIG. 3.

In FIG. 6, the magnetic attraction between the magnets 64, on the one hand, and the magnets 65, on the other, is plotted on the vertical axis, where as the gap between these two sets of magnets is plotted on the horizontal axis. As is evident from FIG. 6, the magnetic attraction can be greatly changed by varying the gap a little, as long as the gap size falls in a region where the slope of curve A is acute.

Meanwhile, the second operation unit 51 receives the signal SC output by the first operation unit 44 and the displacement signal SG supplied by the length-measuring device 32. As has been described, the signal SC represents the contact pressure P and the inclination ΔT of the elastic cylinder 40, whereas the signal SG represents the displacement of the probe shaft 3. From these input signals SC and SG, which represent the strain ε along the axis of the cylinder 40 and the inclination ΔT thereof, the second operation unit 51 calculates the actual displacement of the probe shaft 3, and generates data representing the actual displacement of the shaft 3. This data is supplied to a display (not shown), whereby the actual displacement of the probe shaft 3 is monitored.

As has been explained, in the apparatus P2 (FIG. 3), the contact pressure detecting section 8 detects the contact pressure applied from the stylus 4 to the object, and the contact pressure adjusting section 7-1 is controlled in accordance with the contact pressure thus detected, thereby changing the pressure to a target value. Hence, the contact pressure applied from the stylus to the object is adjusted in real time. Further, since the piezoelectric actuators 62 of the contact pressure adjusting section 7-1 can expand or contract very minutely in accordance with the voltage to the control signal SH' supplied to them, the contact pressure applied from the stylus 4 to the object can be adjusted with high precision.

The piezoelectric actuators 62 generate virtually no heat, compared with a solenoid, when the control signal SA' is supplied to them. Hence, this also enables the apparatus P2 to have a very high displacement-measuring accuracy.

Figure 7:
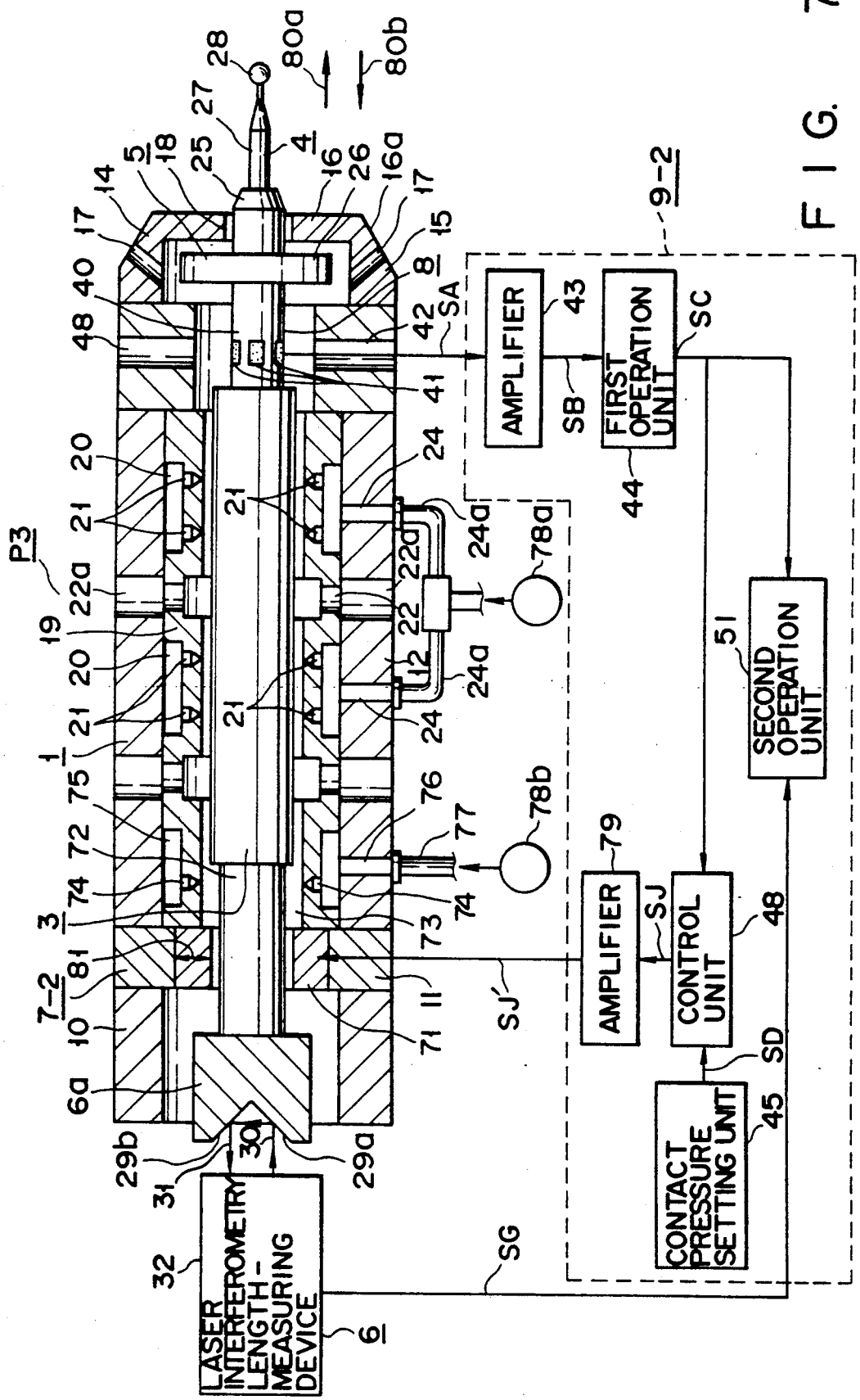
FIG. 7 shows a displacement-measuring apparatus according to a third embodiment of the invention.

FIG. 7 shows a displacement-measuring apparatus P3 according to a third embodiment of the present invention. Some of the components of this apparatus P2 are identical to the corresponding components of the apparatuses P1 and P3, and are therefore designated by the same numerals in FIG. 3 and will not be described in detail.

As is shown in FIG. 7, the apparatus P3 comprises a cylindrical housing 1, an air bearing 2 (i.e., a static-pressure bearing) located in the housing 1, and a probe shaft 3 supported in non-contact fashion by the bearing 2, having a circular cross section and able to move in its axial direction.

The displacement-measuring apparatus P3 further comprises a stylus 4, a stopper 5, and a length-measuring section 6. The stylus 4 is connected to the distal end of the probe shaft 3 and positioned coaxial with the shaft 3. It is set in direct contact with an object in order to measure the displacement of the object. The stopper 5 is arranged between the shaft 3 and the stylus 4, for restricting the axial movement of the probe shaft 3. The length-measuring section 6 is attached to the proximal end of the probe shaft 3. The section 6 has a corner cube 6a which is designed to detect the displacement of the probe shaft 3.

The apparatus P3 has a contact-pressure adjusting section 7-2, a contact-pressure detecting section 8, and a contact-pressure controlling section 9-2. The section 7-2 is located in the proximal end portion of the housing 1 and mounted on the probe shaft 3. The section 8 is located between the shaft 3 and the stopper 5, for detecting the contact pressure applied from the stylus 4 to the object and generating an electric signal representing the pressure detected. The section 9-2 is an electric device for generating a control signal from the signal generated by the contact pressure detecting section 8 and supplying the control signal to the contact pressure adjusting section 7-2.

The housing 1 comprises five parts 10 to 14. The first part 10 surrounds the corner cube 6a and is positioned coaxial therewith. The second part 11 is coupled to the first part 10 and holds the contact pressure adjusting section 7-2. The third part 12 is connected to the second part 11 and holds the air bearing 2. The fourth part 13 is connected to the third part 12, surrounds the contact pressure detecting section 8, and is located coaxial therewith. The fifth part 14 is coupled to the fourth part 13, loosely holds the stopper 5, and is positioned coaxial therewith. A stopper 5 is in the fifth part 14 and located coaxial therewith.

The air bearing 2 is formed of a hollow cylindrical metal bush 19. Two annular guide grooves 20 are cut in the outer circumferential surface of the bush 19. Restriction holes 21 are made in the bottom of either guide groove 20, narrowing toward, and opening at, the inner circumferential surface of the bush 19. Outlet holes 22 are made in that thick-wall portion of the bush 19 which is located between the annular guide grooves 20. The holes 22 are spaced equidistantly part around the circumference of the bush 19. Compressed air is jetted from the grooves 20 via the restriction holes 21 into the interior of the air bearing 2. The air is discharged from the bush 19 through the outlet holes 22.

Another set of outlet holes 22a are made in the third part 12 of the housing 1 and positioned coaxial with the outlet holes 22 of the metal bush 19. The third part 12 has two inlet holes 24 which communicate with the annular guide grooves 20 of the bush 19. It is through these inlet holes 24 that compressed air is supplied to the guide groove 20 and ultimately into the interior of the air bearing 2. Both inlet holes 24 are connected to a first compressed air source 78a by conduits 24a.

Figure 8:
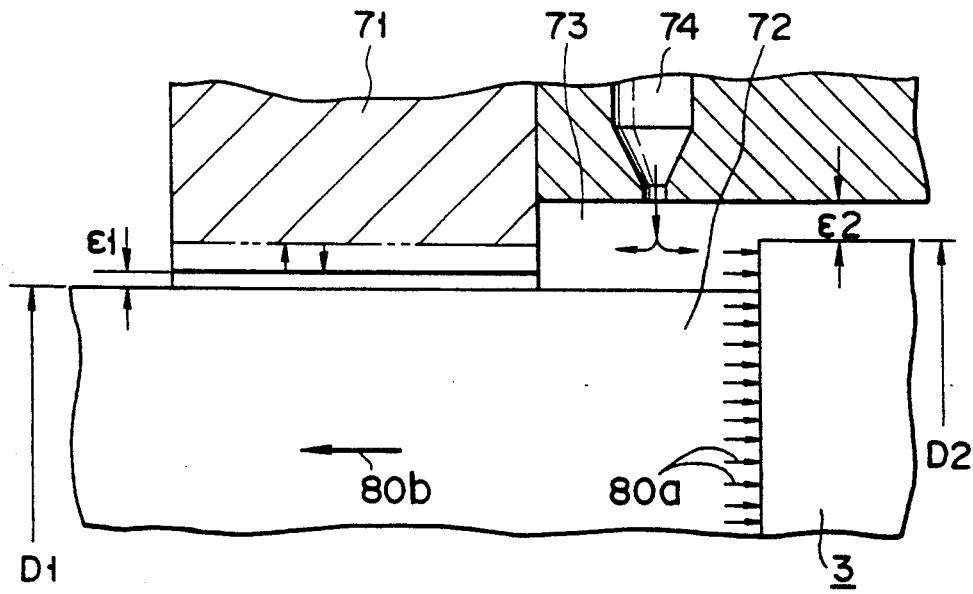
FIG. 8 is an enlarged view showing a part of the apparatus shown in FIG. 7.

As is shown in FIGS. 7 and 8, the contact pressure adjusting section 7-2 of the apparatus P3 comprises a hollow cylindrical electrostrictive element 71, a shaft 72, a conduit 77, and a second compressed air source 78b. The electrostrictive element 71 is fitted in the second part 11 of the housing 1. The shaft 72 is loosely inserted in the element 71. The shaft 72 is integrally formed with the probe shaft 3, extending from the proximal end of the shaft 3 and through the electrostrictive element 71 and aligned coaxial therewith. The shaft 72 has a diameter D1 smaller than that D2 of the shaft 3. The junction between the shafts 3 and 72 form a stepped portion, which is located near the electrostrictive element 71.

The conduit 77 is connected to an air inlet hole 76 which is made in the metal bush 19 and which opens to an annular U-groove 75 formed in the outer circumferential surface of the bush 19. Restriction holes 74 are made in the bottom of the groove 75, each narrowing toward, and opening at, the inner circumferential surface of the bush 19. Hence, compressed air can be supplied from the source 78b via the conduit 77, the inlet hole 76, the U-groove 75 and the restriction holes 74 into an annular space 73 which is defined by the proximal end of the probe shaft 3, the electrostrictive element 71 and the inner circumferential surface of the metal bush 19.

The electrostrictive element 71 is electrically connected to the contact pressure controlling section 9-2. The element 17 is made of sintered ceramic, preferably, the ceramic is $Pb(Zr, Ti)O_3$ (PZT), $PbTiO_3$ (PT), or $(Pb, La)(Zr, Ti)O_3$ (PLZT). When applied with a voltage from the section 9-2, the element 71 expands or contracts in the radial direction of the housing 1.

As is evident from FIG. 8, the gap $\epsilon_1$ between the element 71 and the shaft 72 is narrower than the gap $\epsilon_2$ between the bush 19 and the probe shaft 3; that is, $\epsilon_1 < \epsilon_2$. The gap $\epsilon_1$ changes as the voltage is applied to the element 71 from the contact pressure controlling section 9-2.

The section 9-2 is identical to the contact pressure controlling section 9-1 of the apparatus P2 (FIG. 3). The amplifier 79 of this section 9-2 is connected to the electrostrictive element 71 of the contact pressure adjusting section 7-2.

The operation of the displacement-measuring apparatus P3 will now be explained.

First, compressed air is supplied from the first air source 78a into the gap between the probe shaft 3 and the housing 1 through the conduits 24a, the inlet holes 24, the annular guide grooves 20, and the restriction holes 21. As a result, the air bearing 2 supports the probe shaft 3 in non-contact fashion, positioning the shaft 3 coaxial with the housing 1. In the meantime, compressed air is supplied from the second air source 78b into the annular space 73 through the conduit 77, the inlet hole 76, the annular groove 75, and the restriction holes 74. The pressure of the air is applied, in the directions of arrows shown in FIG. 8, to the electrostrictive element 71 and also stepped portion, i.e., the junction between the shafts 3 and 72. As a result, the probe shaft 3 is slightly moved to the right, whereby the stylus 4 applies a contact pressure to the object (not shown). The compressed air is discharged from the apparatus P3 through the outlet holes 22 of the metal bush 19, the outlet holes 22a of the third housing part 12, and finally through the hole 17 of the fifth housing part 14 and the through holes 42 of the fourth housing part 13.

Next, the apparatus P3 is positioned, bringing the stylus 4 into contact with the object. At this time, the contact pressure controlling section 9-2 and the length-measuring device 32 are already operative. The device 32 applies a laser beam 30 to the first reflection surface 29a of the corner cube 6a, receives the laser beam 31 reflected from the second reflection surface 29b of the corner cube 6a, and measures the displacement of the probe shaft 3.

When the stylus 4 contacts the object, the probe shaft 3 tends to move backwards, in the direction of arrow 80a as is shown in FIG. 7. However, it is pushed forward in the direction of arrow 80b since the pressure of the compressed air in the annular space 73 acts on the proximal end of the probe shaft 3 as is shown in FIG. 8. As a result, the stylus 4 applies a contact pressure to the object, giving a strain to the elastic cylinder 40 and, hence, deforming the cylinder 40.

Then, the strain detecting means 41 on the circumferential surface of the elastic cylinder 40 generate displacement signals SA, each representing the voltage equivalent to the strain the gauge 41 detects. These signals SA are supplied to the contact pressure controlling section 9-2. In the section 9-2, the amplifier 43 amplifies the signals SA and outputs signals SB. The signals SB are supplied to the first operation unit 44. From these signals SB, the unit 44 calculates the strain along the axis of the elastic cylinder 40 which is proportional to the contact pressure P, and also determines the inclination $\Delta T$ of the cylinder 40 with respect to the axis of the probe shaft 3. The unit 44 generates an electric signal SC representing both the contact pressure P and the inclination $\Delta T$.

In the meantime, the contact pressure setting unit 45 sets a target contact pressure PA which the stylus 4 should apply to the object, and outputs a target-pressure signal SD. The control unit 48 receives the signal SD and also the electric signal SC output by the first operation unit 44. The unit 48 outputs a control signal SJ for eliminating the difference $\Delta P$ between the target contact pressure PA set by the unit 35 and the contact pressure P. The control signal SJ is input to the amplifier 79. The amplifier 79 amplifies the control signal SJ, and outputs an amplified signal SJ'. The signal SJ' is supplied to the electrostrictive element 71 of the contact pressure adjusting section 7-2.

In accordance with the voltage of the control signal SJ', the electrostrictive element 71 expands or contracts in the direction of arrow 81 shown in FIG. 7. As a result, the gap $\epsilon_1$ between the element 71 and the shaft 72 changes, whereby the air pressure in the annular space 73 changes in inverse proportion to the gap $\epsilon_1$. That is, the larger the gap $\epsilon_1$, the lower the air-pressure, and the lower the contact pressure applied from the stylus 4 to the object. Conversely, the smaller the gap $\epsilon_1$, the higher the air pressure, and the higher the contact pressure applied from the stylus 4 to the object.

That is, the expansion or contraction of electrostrictive element 71 is controlled by the control signal SJ', thereby adjusting the contact pressure the stylus 4 applies to the object.

Meanwhile, in the the contact pressure controlling section 9-2, the second operation unit 51 receives the signal SC output by the first operation unit 44 and the displacement signal SG supplied by the length-measuring device 32. As has been described, the signal SC represents the contact pressure P and the inclination $\Delta T$ of the elastic cylinder 40, whereas the signal SG represents the displacement of the probe shaft 3. From these input signals SC and SG, which represent the strain $\epsilon$ along the axis of the cylinder 40 and the inclination $\Delta T$ thereof, the second operation unit 51 calculates the actual displacement of the probe shaft 3, and generates data representing the actual displacement of the shaft 3. This data is supplied to a display (not shown), whereby the actual displacement of the probe shaft 3 is monitored.

As has been explained, in the apparatus P3 (FIG. 7), the contact pressure detecting section 8 detects the contact pressure applied from the stylus 4 to the object, and the contact pressure adjusting section 7-2 is controlled in accordance with the contact pressure thus detected, thereby changing the pressure to a target value. Hence, the contact pressure applied from the stylus to the object is adjusted in real time. Further, since the electrostrictive element 71 of the contact pressure adjusting section 7-2 can expand or contract very minutely in accordance with the voltage to the control signal SJ' supplied to them, the contact pressure applied from the stylus 4 to the object can be adjusted with high precision.

The electrostrictive element 71 generates virtually no heat, compared with a solenoid, when the control signal SH' is supplied to them. Hence, this also enables the apparatus P2 to have a very high displacement-measuring accuracy.

Figure 9:
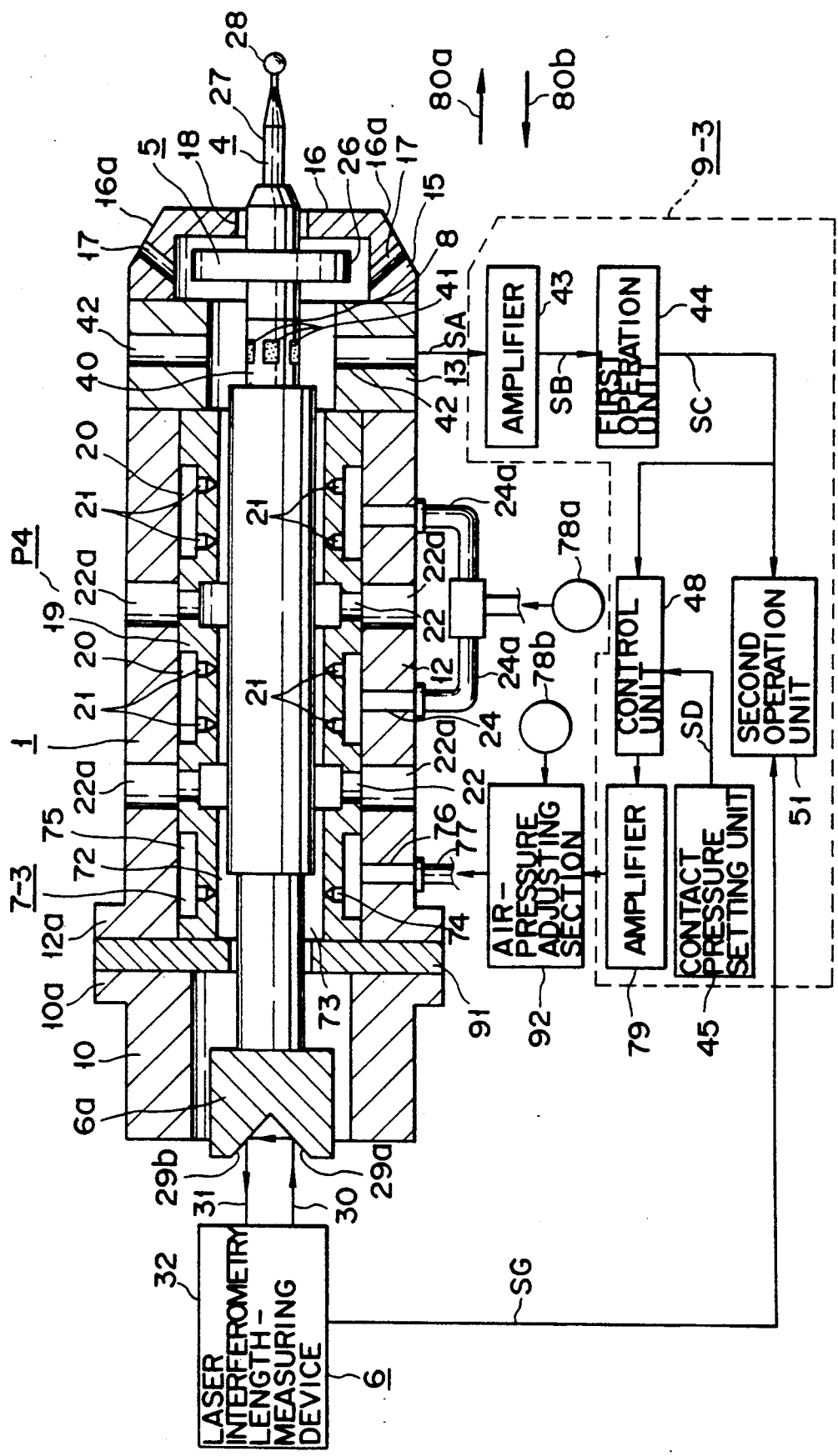
FIG. 9 is a diagram showing a displacement-measuring apparatus according to a fourth embodiment of the invention.

FIG. 9 shows a displacement-measuring apparatus P4 according to a fourth embodiment of the invention. This apparatus P4 is identical to the apparatus P3 shown in FIGS. 7 and 8, except for two aspects. First, the contact pressure adjusting section 7-2 has an exhaustion adjusting disk 91 in place of the electrostrictive element 71. Second, an air-pressure adjusting section 92 is connected at input to the second compressed air source 78b, and at the output to the conduit 77.

The disk 91 is made of metal and has a center hole. It is clamped between the flange 10a of the first housing part 10 and the flange 12a of the third housing part 12. The shaft 72 is loosely inserted in the center hole of the exhaustion adjusting disk 91. The gap $\epsilon_1$ between the shaft 72 and the disk is narrower than the gap $\epsilon_2$ between the probe shaft 3 and the metal bush 19, as in the case of the apparatus P3. However, the gap $\epsilon_1$ remains unchanged, unlike the gap $\epsilon_1$ between the shaft 72 and the element 71 in the apparatus P3 (FIG. 7).

The air-pressure adjusting section 92 adjusts the pressure of the compressed air supplied from the second air source 78b, thus changing the force which the compressed air in the annular space 73 exerts on the proximal end of the probe shaft 3 in the direction of arrow 80a. As a result, the contact pressure which the stylus 4 applies to the object (not shown) is controlled. Hence, the apparatus P4 achieves the same advantages as the displacement-measuring apparatus P3.

In the four embodiments described above, the probe shaft 3 can be prevented from rotating about its axis by any known mechanism. For instance, a pin protruding from the metal bush 19 in the axial direction thereof can be loosely set in a groove cut in the circumferential surface of the shaft 3 and extending parallel to the axis thereof. Conversely, a pin protruding from the shaft 3 in the axial direction thereof can be loosely set in a groove cut in the inner circumferential surface of the bush 19 and extending parallel to the axis thereof.

Also in the four embodiments described above, the contact pressure detecting section and the contact pressure controlling section can be dispensed with. If these sections are not used, generation of heat is prevented in the contact pressure adjusting section, resulting in various advantages.

Figure 10:
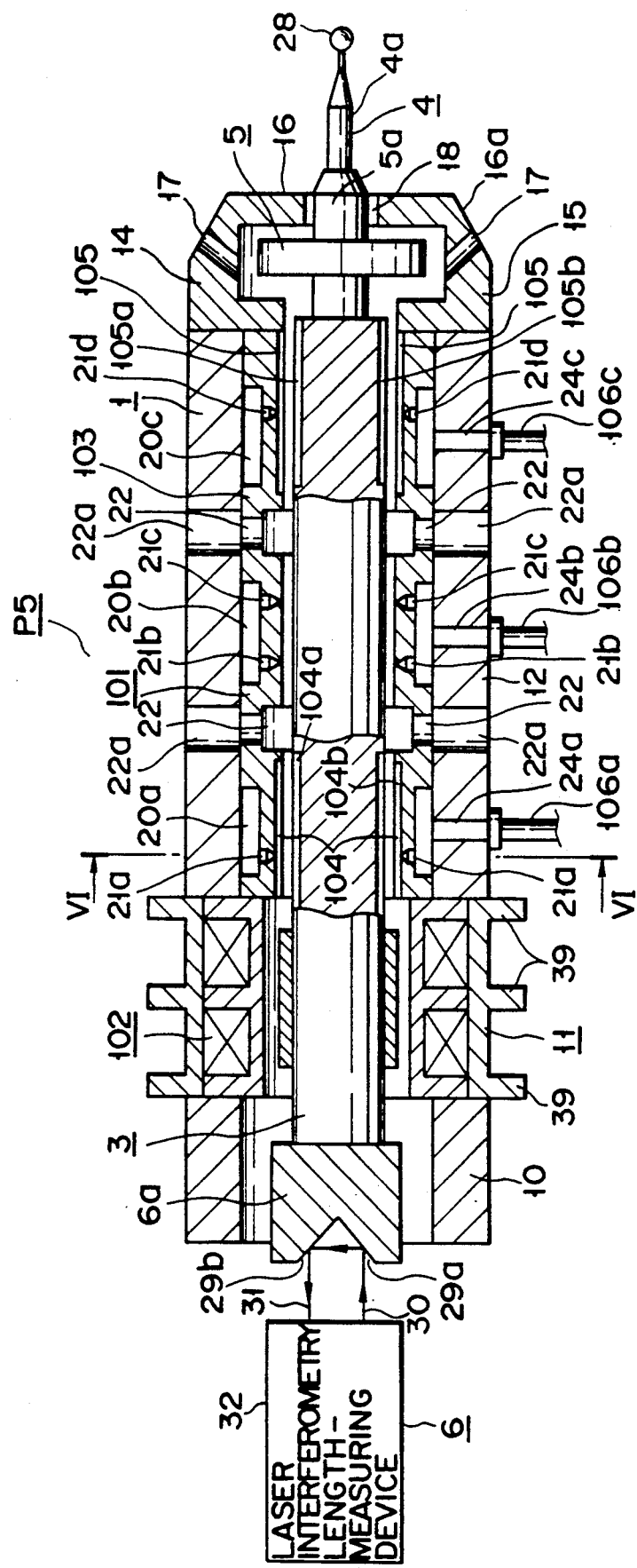
FIG. 10 shows a displacement-measuring apparatus according to a fifth embodiment of the invention.

FIG. 10 shows a displacement-measuring apparatus P5 according to a fifth embodiment of the invention. Some of the components of this apparatus P5 are identical to the corresponding components of the apparatuses P1 to P4, and are therefore designated by the same numerals in FIG. 3 and will not be described in detail.

The apparatus P5 comprises a cylindrical housing 1, an air bearing 101 located in the housing 1, and a probe shaft 3 supported in non-contact fashion by the air bearing 101, having a circular cross section and able to move in its axial direction.

The displacement-measuring apparatus P5 further comprises a stylus 4, a stopper 5, a length-measuring section 6, and a contact pressure adjusting section 102. The stylus 4 is connected to the distal end of the probe shaft 3 and positioned coaxially with the shaft 3. It is set in direct contact with an object in order to measure the displacement of the object. The stopper 5 is arranged between the shaft 3 and the stylus 4, for restricting the axial movement of the probe shaft 3. The length-measuring section 6 is attached to the proximal end of the probe shaft 3. The section 6 has a corner cube 6a which is designed to detect the displacement of the probe shaft 3. The contact pressure adjusting section 102 is provided in the proximal end portion of the housing 1 and surrounds the proximal end portion of the probe shaft 3.

The housing 1 comprises four parts 10, 11, 12, and 14. The first part 10 surrounds the corner cube 6a and is positioned coaxially therewith. The second part 11 is connected to the first part 10 and holds the contact pressure adjusting section 102. The third part 12 is connected to the second part 11 and holds the air bearing 101. The fourth part 14 is coupled to the third part 12 and positioned coaxial therewith, and loosely holds the stopper 5.

The fourth part 14 of the housing 1 comprises a cylindrical section 15 and an end plate 16 closing the distal end of the cylindrical section 15. The cylindrical section 15 has a tapered circumferential surface 16a. A through hole 17 is formed in the cylindrical section 15 and opens at one end in the surface 16a and at the other end at the inner surface. A through hole 18 is formed in the end plate 16, coaxial with the stopper 5.

The air bearing 101 is formed of a hollow cylindrical metal bush 103. Three annular guide grooves 20a, 20b, and 20c are cut in the outer circumferential surface of the bush 103. Four restriction holes 21a are made in the bottom of the first guide groove 20a and equidistantly spaced apart along the circumference of the bush 103. Eight restriction holes 21b are formed in the bottom of the second guide groove 20b and equidistantly spaced apart along the circumference of the bush 103. Eight restriction holes 21c of another set are cut in the bottom of the second guide groove 20b and equidistantly spaced apart along the circumference of bush 103. Further, four restriction holes 21d are formed in the bottom of the third guide groove 20c and equidistantly spaced apart along the circumference of the bush 103. Each of the restriction holes 21a, 21b, 21c and 21d becomes narrower toward the the inner surface of the bush 103, and opens at the inner surface thereof.

Outlet holes 22 are made in that thick-wall portions of the bush 103 which are located between the annular guide grooves 20a, 20b and 20c. The holes 22 are equidistantly spaced part around the circumference of the bush 103. Compressed air is jetted from the grooves 20a, 20b and 20c through the restriction holes 21a, 21b and 21c, 21d into the interior of the air bearing 101. The air is discharged from the bush 103 through the outlet holes 22.

Two sets of outlet holes 22a are made in the third part 12 of the housing 1 and positioned coaxial with the outlet holes 22 of the metal bush 103. The third part 12 has three inlet holes 24a, 24b and 24c which communicate with the annular guide grooves 20a, 20b and 20c of the metal bush 1103, respectively. It is via these inlet holes 24a, 24b and 24c that compressed air is supplied to the guide grooves 20a, 20b and 20c and ultimately into the interior of the air bearing 101. The inlet holes 24a, 24b and 24c are connected to a source of compressed air (not shown) by three conduits 106a, 106b, and 106c, respectively.

Figure 11:
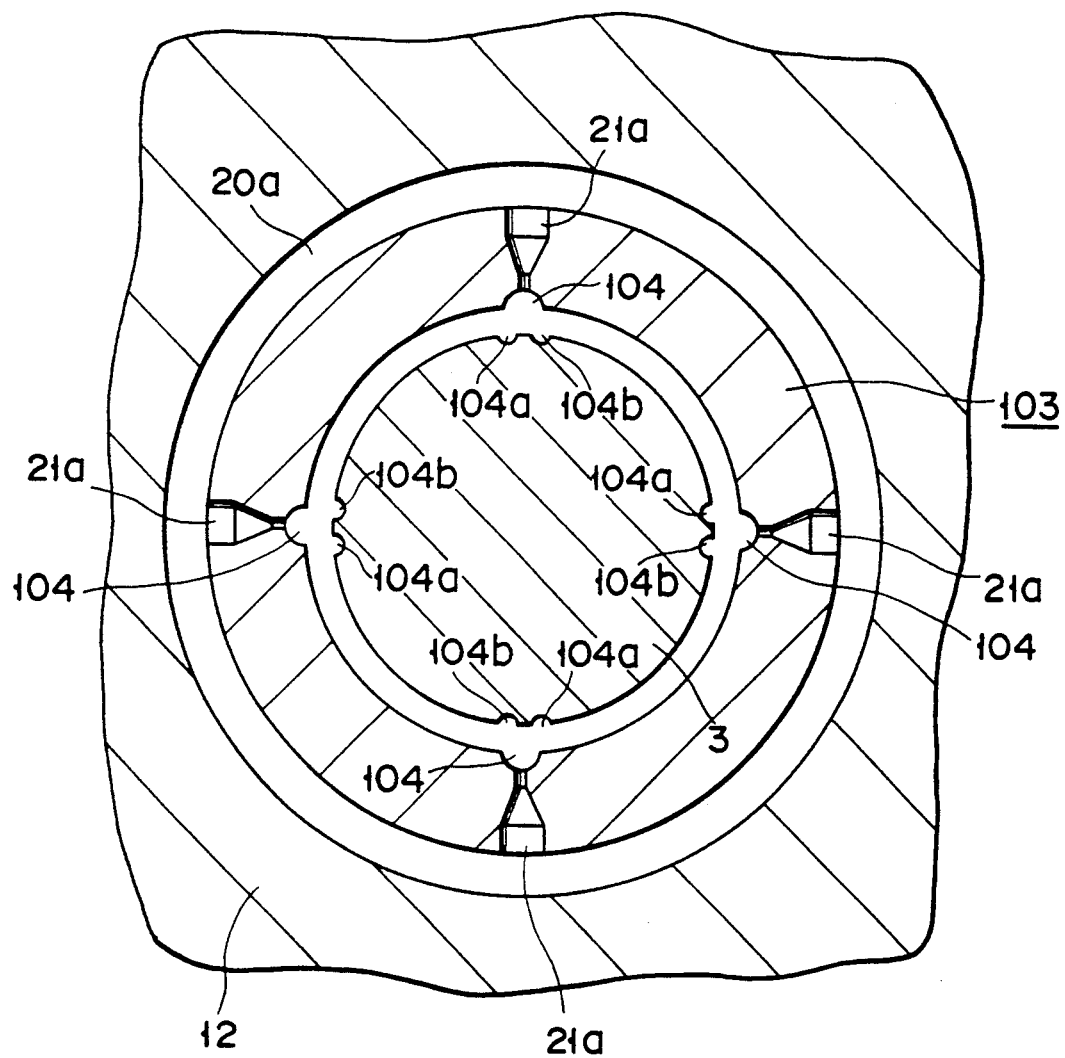
FIG. 11 is a cross-sectional view, taken along line VI—VI in FIG. 10.

As is shown in FIGS. 10 and 11, four grooves 104 are formed in the inner surface of the proximal end portion of the bush 103. These grooves 104 extend parallel to the axis of the bush 103, and have a semicircular cross section, and equidistantly spaced apart along the circumference of the metal bush 103. The four restriction holes 21a–21d open at the bottoms of these grooves 104, respectively. Four pairs of grooves 104a and 104b are made in the circumferential surface of the middle portion of the probe shaft 3. The grooves 104a and 104b extend along the axis of the shaft 3 and have a semicircular cross section. The grooves 104a and 104b of each pair oppose the corresponding groove 104 of the metal bush 103.

Similarly, two grooves 105 are formed in the inner surface of the distal end portion of the bush 103; they extend parallel to the axis of the bush 103, and have a semicircular cross section, and are equidistantly spaced apart along the circumference of the bush 103. The four restriction holes 21a–21d open at the bottom of the grooves 105. Four pairs of grooves 105a and 105b are formed in the circumferential surface of the distal end portion of the probe shaft 3. The grooves 105a and 105b extend along the axis of the shaft 3 and have a semicircular cross section. The grooves 105a and 105b of each pair oppose the corresponding groove 105 of the metal bush 103.

The grooves 104, 105, 104a, 104b, 105a and 105b are of the same length, which is longer than the stroke of the probe shaft 3.

The stopper 5 is comprised of a shaft 5a and a flange 5b. The shaft 5a is coupled to the probe shaft 3 and is coaxial therewith. Its distal end portion protrudes from the distal end of the housing 1, extending through the hole 18 of the end plate 16. The flange 5b is mounted on the middle portion of the shaft 5a. The flange 5b can move in the axial direction of the probe shaft 3 in the space between the third part 12 of the housing 1 and the end plate 16. Hence, the stopper 5 can move back and forth, for the distance between the housing part 12 and the end plate 16.

The stylus 4 comprises a main shaft 4a and a ruby ball 28. The main shaft has a pointed distal end. The ruby ball 28 is connected to the pointed end of the main shaft 4a.

The length-measuring section 6 comprises the corner cube 6a and a laser interferometry length-measuring device 32. The corner cube 6a has two reflection surfaces 29a and 29b at its proximal end. These surfaces 29a and 29b incline at 45° to the axis of the probe shaft 3 and intersect at 90° with each other. The length-measuring device 32 applies a laser beam 30 to the first reflection surface 29a along the axis of the probe shaft 3, and detects the displacement of the probe shaft 3 from the interference characteristic of the laser beam 31 reflected by both reflection surfaces 29a and 29b and applied to the device 32 along the axis of the shaft 3.

The contact pressure adjusting section 102 comprises a hollow cylindrical bobbin 33, a pair of coils 36 and 37, and a hollow cylindrical core 38. The core 38 is mounted on the probe shaft 3. The bobbin 33 surrounds the core 38 and has two annular U-grooves cut in its outer circumferential surface.

Electric power is supplied to the coils 36 and 37 from a power supply (not shown). The power is changed, thereby changing the magnetic force generated between the core 38 and the coils 36 and 37. When supplied with electric power, either coil generates heat. Nonetheless, the heat is radiated effectively from the second part 11 of the housing 1 since heat-radiating annular fins 39 are mounted on the second housing part 11.

The operation of the displacement-measuring apparatus P5 described above will now be explained.

First, compressed air is supplied into the annular guide grooves 20a, 20b and 20c through the inlet holes 24a, 24b and 24c. The air is further supplied into the gap between the probe shaft 3 and the metal bush 103 via the restriction holes 21a, 21b, 21c, and 21d made in the bottoms of the guide grooves 20a, 20b and 20c. As a result, the air bearing 10 supports the probe shaft 3 in non-contact fashion, positioning the shaft 3 coaxial with the housing 1. The compressed air jetting through the restriction holes 21a to 21d is discharged from the apparatus P5 through the outlet holes 22 of the metal bush 103, the outlet holes 22a of the third housing part 12, and also through the hole 17 of the fourth housing part 14.

Figure 12:
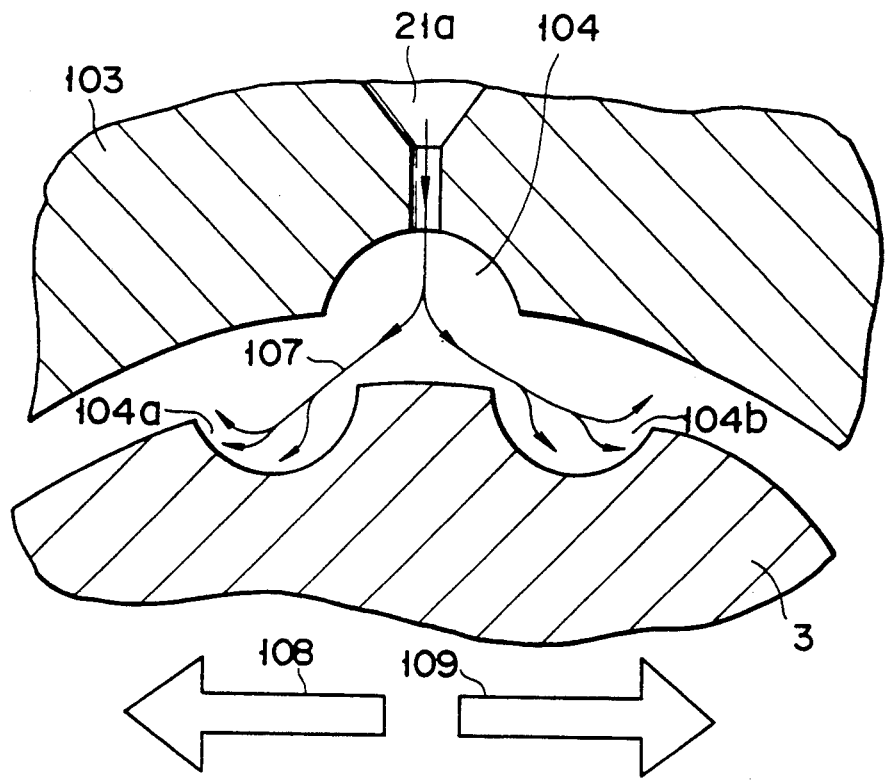
FIGS. 12 and 13 are diagrams explaining how the apparatus of FIG. 10 performs its function.

As is shown in FIG. 12, the compressed air supplied via the restriction holes 21a to 21d into the gap between the probe shaft 3 and the metal bush 103 flows into the grooves 104a, 104b, 105a and 105b formed in the circumferential surface of the probe shaft 3, as is indicated by arrows 107. This is because the grooves 104a and 104b of any pair are positioned symmetrically with respect to the axis of the restriction hole 21a, and the grooves 105a and 105b of any pair are positioned symmetrically with respect to the axis of the restriction hole 21d, and hence the same air pressure is applied to the grooves 104a and 104b and also to the grooves 105a and 105b. As a result, two forces act on the shaft 3 in the opposite directions indicated by arrows 108 and 109. The probe shaft 3 therefore does not rotate around its axis unless another force is exerted on it in the direction of arrow 108 or 109.

The length-measuring device 32 applies a laser beam 30 to the first reflection surface 29a along the axis of the probe shaft 3, and detects the displacement of the probe shaft 3 from the interference characteristic of the laser beam 31 reflected by both reflection surfaces 29a and 29b and applied to the device 32 along the axis of the shaft 3.

Predetermined electric power is supplied to the coils 36 and 37. The coils 36 and 37 generate magnetic fields, which thrust the probe shaft 3 forward. As a result, the stylus 4 attached to the shaft 3 applies a predetermined contact pressure to the object.

Figure 13:
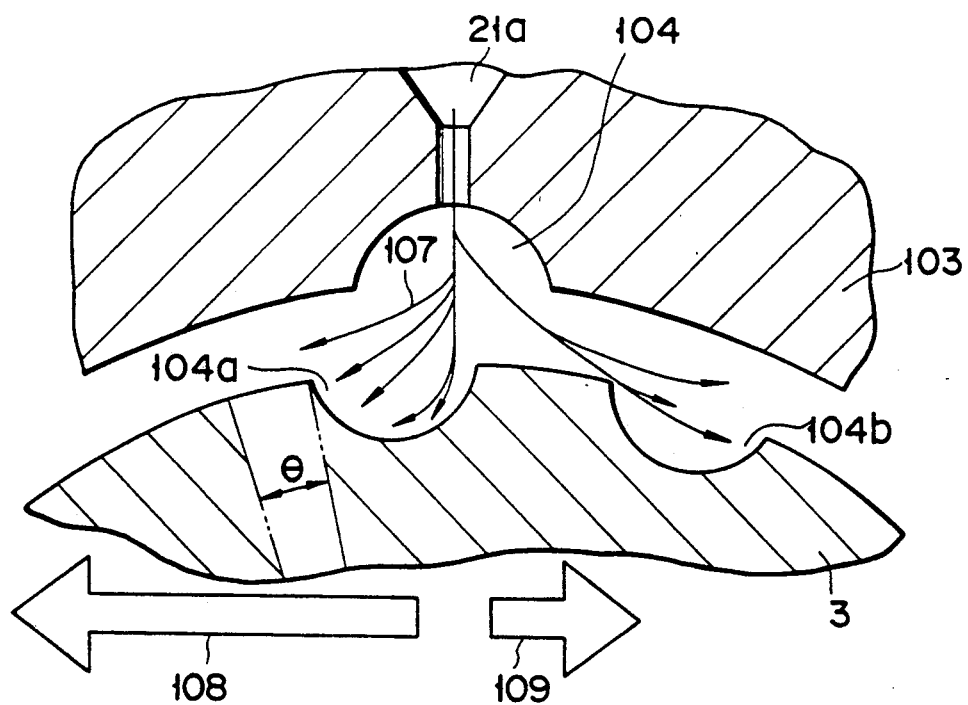

It is possible that a force other than the air pressure is exerted on the probe shaft 3 in the direction of arrow 109, rotating the shaft 3 by angle $\theta$ as is shown in FIG. 13. In this case, the groove 104a (105a) is located closer to the axis of the hole 21a (21d) than the groove 104b (105b). Hence, more compressed air flows into the groove 104a (105a) than into the groove 104b (105b), and a greater force acts on the shaft 3 in the direction of arrow 108 than in the direction of arrow 109. As a result, the probe shaft 3 is rotated in the direction of arrow 108 until the grooves 104a and 104b (the grooves 105a and 105b) are located symmetrically with respect to the axis of the restriction hole 21a (21d).

Since the probe shaft 3 is prevented from rotating around its axis as long as it is supported by the air bearing 101 in non-contact fashion, no sliding friction occurs between the shaft 3 and the metal bush 103 while the shaft 3 is moved along its axis. Therefore, the probe shaft 3 is stably supported throughout the operation of the displacement-measuring apparatus P5. This greatly helps to enhance the reliability and measuring accuracy of the apparatus P5.

Further, since the probe shaft 3 does not need to be machined into one having a rectangular cross section, it can be made at low cost. Also, since it has a relatively simple structure, it can be made small. This serves to reduce the manufacturing cost of the displacement-measuring apparatus P5.

The grooves 104 are formed in the inner surface of the proximal end portion of the bush 103, whereas the grooves 105 are made in the inner surface of the distal end portion of the bush 103. The grooves 104a and 104b are formed in the circumferential surface of the middle portion of the shaft 3, whereas the grooves 105a and 105b are cut in the circumferential surface of the distal end portion of the shaft 3. Instead, grooves equivalent to the grooves 104 and 105 can be formed in the inner surface of only the middle portion of the bush 103, and grooves equivalent to the grooves 104a, 104b, 105a and 105b can be made in the circumferential surface of only the middle portion of the probe shaft 3. Alternatively, grooves equivalent to the grooves 104 and 105 can be formed in the inner surfaces of three or more portions of the bush 103, and grooves equivalent to the grooves 104a, 104b, 105a and 105b can be formed in the circumferential surfaces of the three or more portions of the probe shaft 3.

The axial groove 104 or 105 and the axial grooves 104a and 104b or 105a and 105b need not be provided for each of the restriction holes made in the bush 103 and spaced apart along the circumference of the bush 103. They can be provided for only some of these restriction holes. Even so, the rotation of the probe shaft 3 can be suppressed sufficiently.

Further, eight restriction holes equivalent to the eight holes of either set made in the second annular groove 20b of the metal bush 103 can be made also in the first and third annular grooves 20a and 20c.

The apparatus P5 shown in FIG. 10 has a mechanism of suppressing the rotation of the probe shaft 3. As can be understood from the above description, this mechanism comprises the grooves 104 and 105 formed in the inner surface of the metal bush 103 and the grooves 104a, 104b, 105a and 105b made in the circumferential surface of the shaft 3. This specific mechanism can be incorporated not only in displacement-measuring apparatuses, but also in other various types of apparatuses.

Figure 14:
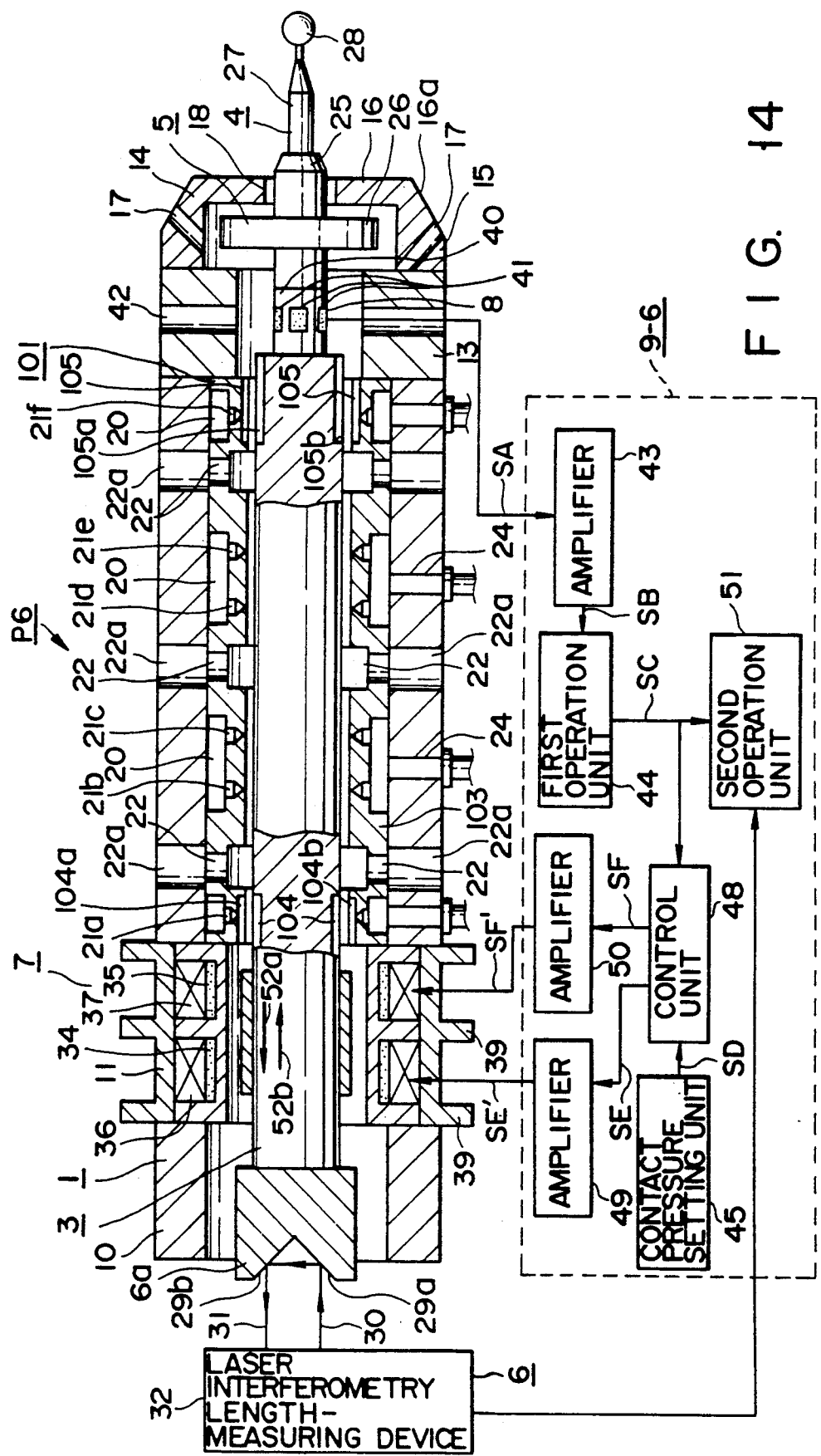
FIG. 14 shows a displacement-measuring apparatus according to a sixth embodiment of the invention.
Figure 15:
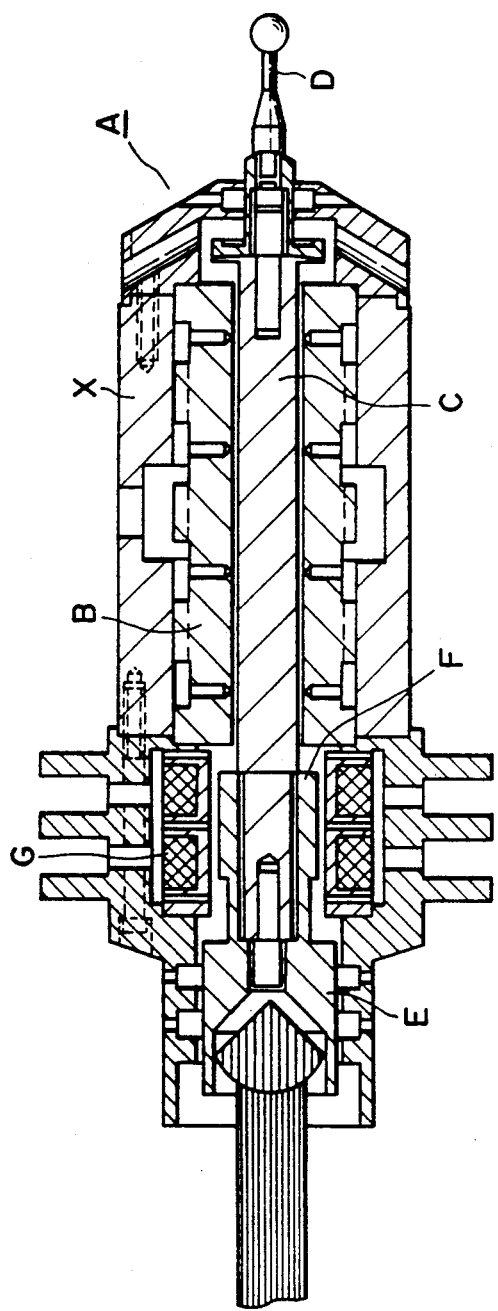
FIG. 15 is a cross-sectional view showing a conventional displacement-measuring apparatus.
Figure 16:
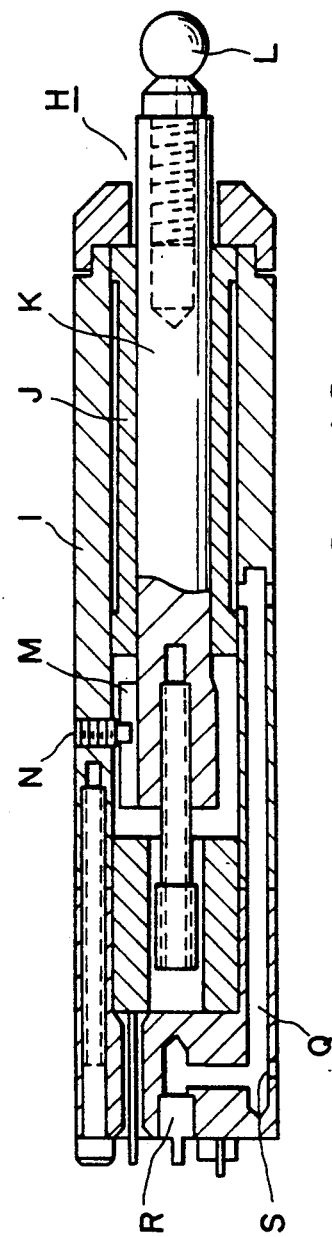
FIG. 16 is a cross-sectional view showing another conventional displacement-measuring apparatus.

FIG. 14 shows a displacement-measuring apparatus P6 which is a sixth embodiment of the present invention. This apparatus P6 is, so to speak, a combination of the apparatuses P1 and P5 shown in FIG. 1 and FIG. 10, respectively. The same components as those of the apparatuses P1 and P5 are designated by the same numerals used in FIGS. 1 and 10, and will not be described in detail.

As is evident from FIG. 14, the apparatus P6 comprises a contact pressure adjusting section 7, a contact pressure detecting section 8, and a contact pressure controlling section 9-6——all identical to the corresponding components of the apparatus P1. Like the apparatus P5, the apparatus P6 further comprises a probe shaft 3 having grooves 104a, 104b, 105a and 105b made in its circumferential surface and extending along its axis, and a metal bush 103 having grooves 104 and 105 formed in its inner surface and extending along its axis.

The contact pressure detecting section 8 detects the contact pressure the stylus 4 applies to an object. The contact pressure controlling section 9-6 generates control signals SE' and SF' from the signals SA output by the section 8. The contact pressure adjusting section 7 generates electromagnetic forces in accordance with the signals SE' and SF' and applies these forces to the probe shaft 3, thereby changing the contact pressure the stylus 4 is applying to the object to a target value. Hence, whenever the contact pressure is different, even slightly, from the target pressure, it is changed to the target value.

Compressed air is supplied via the restriction holes 21a to 21d into the gap between the probe shaft 3 and the metal bush 103. It then flows into the grooves 104a, 104b, 105a and 105b formed in the circumferential surface of the probe shaft 3, as is indicated by arrows 107. Even if a force other than the air pressure is exerted on the probe shaft 3, rotating the shaft 3 around its axis in one direction, the compressed air is applied to the grooves 104a, 104b, 105a and 105b such that the shaft 3 is rotated in the opposite direction until the grooves 104a and 104b of any pair and the grooves 105a and 105b of any pair are located symmetrically with respect to the axis of the corresponding restriction holes 21a and 21d, respectively. As a result, the probe shaft 3 is prevented from rotating around its axis.

In the apparatus P6, not only the contact pressure applied from the stylus 4 to the object can be controlled, but also the rotation of the probe shaft 3 can be suppressed.

In the apparatus P6, the air bearing 101 is associated with the contact pressure adjusting section 7. According to the invention, the air bearing 101 can be associated with the section 7-1 used in the apparatus P2, the section 7-2 incorporated in the apparatus P3, or the section 7-3 incorporated in the apparatus P4, in place of the contact pressure section 7 used in the apparatus P1.

Moreover, various changes and modification can be made, with departing from the scope and spirit of the present invention.

What is claimed is:

1. A displacement-measuring apparatus comprising:
a cylindrical housing;
a static-pressure bearing located in said housing, wherein said static-pressure bearing comprises:
a hollow cylindrical bush having a plurality of restriction holes formed in said bush, said holes being equidistantly spaced along the circumference of said bush, said holes for supplying air to a gap between said bush and a probe shaft supported by said bearing in non-contact fashion and movable in an axial direction;
a first set of grooves formed in an inner surface of said bush, said grooves extending along an axis of said bush, each groove of said first set opposing at least one restriction hole; and
a second set of grooves formed in the circumferential surface of said probe shaft, the grooves in said second set being disposed in pairs having two grooves symmetrical with respect to a corresponding groove of said first set;
a stylus connected to one end of said probe shaft, for applying a contact pressure on an object;
a pressure-adjusting section for adjusting the contact pressure applied from said stylus to the object;
a pressure-detecting section for detecting the contact-pressure applied from said stylus to the object; and
a pressure-controlling section for generating a control signal in accordance with the contact pressure detected by said pressure-detecting section and supplying the control signal to said pressure-adjusting section, thereby to control the contact pressure.

2. An apparatus according to claim 1, wherein said contact pressure detecting section comprises a pillar-like elastic member interposed between said stylus and said probe shaft, and strain sensors fastened to the circumferential surface of said pillar-like elastic member.

3. A displacement-measuring apparatus, comprising:
a cylindrical housing;
a static-pressure bearing located in said housing, wherein said static-pressure bearing comprises:
a hollow cylindrical bush having a plurality of restriction holes formed in said bush, said holes being equidistantly spaced along the circumference of said bush, said holes for supplying air to a gap between said bush and a probe shaft supported by said bearing in non-contact fashion and movable in an axial direction;
a first set of grooves formed in an inner surface of said bush, said grooves extending along an axis of said bush, each groove of said first set opposing at least one restriction hole; and
a second set of grooves formed in the circumferential surface of said probe shaft, the grooves in said second set being disposed in paris having two grooves symmetrical with respect to a corresponding groove of said first set;
a stylus connected to one end of said probe shaft, for applying a contact pressure to an object; and
contact pressure-adjusting section partly connected to said housing and partly connected to said probe shaft.

4. An apparatus according to claim 3, wherein said contact pressure adjusting section comprises:
a hollow cylindrical bobbin fitted in said housing;
a hollow cylindrical core mounted on that portion of said probe shaft which is surrounded by said bobbin;
permanent magnets fitted in said bobbin, applying magnetic attraction to said core; and
coils wound about said permanent magnets for applying variable magnetic attraction to said core.

5. An apparatus according to claim 4, further comprising:
a contact pressure detecting section connected to said probe shaft, for detecting the contact pressure applied from said stylus to the object; and
a contact pressure controlling section for generating a control signal from the contact pressure detected by said contact pressure detecting section and supplying the control signal to the coils of said contact pressure adjusting section, thereby to change the magnetic attraction applied to said core and to control the contact pressure said stylus is applying to the object.

6. An apparatus according to claim 3, wherein said contact pressure adjusting section comprises actuators secured to an inner surface of said housing and equidistantly spaced apart along the circumference thereof, said actuators expanding or contracting when applied with a voltage, a first set of permanent magnets fixed to said actuators, respectively, a second set of permanent magnets secured to said probe shaft, equidistantly spaced apart along the circumference of said probe shaft, opposing the permanent magnets of the first set, respectively, and generating magnetic attraction jointly with the permanent magnets of the first set, said actuators expanding or contracting when applied with a voltage, thereby changing the gap between each permanent magnet of the first set and the corresponding permanent magnet of the second set and, hence, changing the magnetic attraction.

7. An apparatus according to claim 6, further comprising:
a contact pressure detecting section connected to said probe shaft, for detecting the contact pressure applied from said stylus to the object; and
a contact pressure controlling section for generating a control signal from the contact pressure detected by said contact pressure detecting section and supplying the control signal to said actuators, thereby to change the gap between each permanent magnet of the first set and the corresponding permanent magnet of the second set and, hence, to control the contact pressure said stylus is applying to the object.

8. An apparatus according to claim 3, wherein said contact pressure adjusting section comprises:
a hollow cylindrical electrostrictive element attached to said housing, loosely holding a small-diameter portion of said probe shaft, and expanding or contracting when applied with a voltage to change the gap between the small-diameter portion of said probe shaft and the inner circumferential surface of said electrostrictive element;
a step portion defined by the junction of the small-diameter portion of said probe shaft and a large-diameter portion thereof, and located in the vicinity of said electrostrictive element; and
restriction holes formed in said housing and equidistantly spaced apart along the circumference of said housing, for supplying compressed air into the space defined by said electrostrictive element and said step portion.

9. An apparatus according to claim 8, further comprising:
a contact pressure detecting section connected to said probe shaft, for detecting the contact pressure applied from said stylus to the object; and
a contact pressure controlling section for generating a control signal from the contact pressure detected by said contact pressure detecting section and supplying the control signal to said electrostrictive element, thereby to change the gap between said probe shaft and said electrostrictive shaft and hence, to control the contact pressure said stylus is applying to the object.

10. A displacement-measuring apparatus comprising:
a cylindrical housing;
a static-pressure bearing located in said housing, wherein said static-pressure bearing comprises:
a hollow cylindrical bush having a plurality of restriction holes formed in said bush, said holes being equidistantly spaced along the circumference of said bush, said holes for supplying air to a gap between said bush and a probe shaft having a large-diameter portion and a small-diameter portion, said large diameter portion being supported by said bearing in non-contact fashion and being movable in an axial direction;
a first set of grooves formed in an inner surface of said bush, said grooves extending along an axis of said bush, each groove of said first set opposing at least one restriction hole; and
a second set of grooves formed in the circumferential surface of said probe shaft, the grooves in said second set being disposed in pairs having two grooves symmetrical with respect to a corresponding groove of said first set;
a stylus connected to one end of said probe shaft, for applying a contact pressure to an object; and
a contact pressure-adjusting section partly connected to said housing and partly connected to said probe shaft, for adjusting the contact pressure said stylus is applying to the object;
wherein said contact pressure adjusting section includes an exhaustion adjusting plate loosely holding said probe shaft, a step portion defined by the large-diameter portion and small-diameter portion of said probe shaft and located in the vicinity of said exhaustion adjusting plate, a plurality of restriction holes for supplying compressed air into a space defined by said exhaustion adjusting plate and said step portion, and air-supplying means for supplying compressed air under a variable pressure into said restriction holes.

11. An apparatus according to claim 10, further comprising:
a contact pressure detecting section connected to said probe shaft, for detecting the contact pressure applied from said stylus to the object; and
a contact pressure controlling section for generating a control signal from the contact pressure detected by said contact pressure detecting section and supplying the control signal to said air-supplying means, thereby to change the pressure of the compressed air and, hence, to control the contact pressure said stylus is applying to the object.

12. A static-pressure bearing device comprising:
a shaft having a circular cross section;
a bush loosely holding said shaft including:
a plurality of restriction holes formed in said bush and equidistantly spaced along the circumference of said bush, for supplying air into a gap between said shaft and said bush;
a first set of grooves formed in an inner surface of said bush, extending along an axis of said bush, and each opposing at least one restriction holes; and
a second set of grooves formed in a circumferential surface of said shaft, extending along an axis of said shaft, and disposed in pairs, each pair consisting of two grooves symmetrical with respect to a corresponding groove of the first set.

13. A displacement-measuring apparatus comprising:
a cylindrical housing;
a static-pressure bearing located in said housing;

a probe shaft supported by said bearing in non-contact fashion and movable in an axial direction; and a stylus connected to one end of said probe shaft, for applying a contact pressure to an object, wherein part of said static-pressure bearing comprises a hollow cylindrical bush, a plurality of restriction holes formed in said bush and equidistantly spaced apart along the circumference of said bush, for supplying air into the gap between said probe shaft and said bush, a first set of grooves formed in the inner surface of said bush, extending along the axis of said bush, and each opposing at least one restriction hole, and a second set of grooves formed in the circumferential surface of said probe shaft, extending along the axis of said probe shaft, and arranged in pairs, each pair consisting of two grooves symmetrical with respect to the corresponding groove of the first set.

* * * * *